US012726697B2

(12) United States Patent
Hosokawa

(10) Patent No.: US 12,726,697 B2
(45) Date of Patent: Sep. 1, 2026

(54) INFORMATION PROCESSING APPARATUS, INFORMATION PROCESSING METHOD, AND RECORDING MEDIUM

(71) Applicant: SONY GROUP CORPORATION, Tokyo (JP)

(72) Inventor: Kenichiro Hosokawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 26 days.

(21) Appl. No.: 18/846,633

(22) PCT Filed: Mar. 1, 2023

(86) PCT No.: PCT/JP2023/007501

§ 371 (c)(1),
(2) Date: Sep. 12, 2024

(87) PCT Pub. No.: WO2023/181808

PCT Pub. Date: Sep. 28, 2023

(65) Prior Publication Data

US 2025/0227362 A1 Jul. 10, 2025

(30) Foreign Application Priority Data

Mar. 23, 2022 (JP) ................................ 2022-046934

(51) Int. Cl.
*H04N 23/60* (2023.01)
*H04N 5/262* (2006.01)
*H04N 23/90* (2023.01)

(52) U.S. Cl.
CPC ........... *H04N 23/64* (2023.01); *H04N 5/2628* (2013.01); *H04N 23/90* (2023.01)

(58) Field of Classification Search
CPC ...... H04N 23/64; H04N 5/2628; H04N 23/90; H04N 23/60; H04N 7/144; H04N 7/15;
(Continued)

(56) References Cited

U.S. PATENT DOCUMENTS 8,928,659 B2 * 1/2015 Bar-Zeev ................ G06T 15/20 345/158
2003/0197779 A1 * 10/2003 Zhang .................... H04N 7/144 348/14.09

(Continued)

FOREIGN PATENT DOCUMENTS

JP 2021-071735 A 5/2021
KR 10-2015-0073174 A 6/2015

(Continued)

OTHER PUBLICATIONS

International Search Report and Written Opinion of PCT Application No. PCT/JP2023/007501, issued on May 23, 2023, 09 pages of ISRWO.

*Primary Examiner* — Abdelaaziz Tissire
(74) *Attorney, Agent, or Firm* — CHIP LAW GROUP

(57) ABSTRACT

Provided is an information processing apparatus that includes a controller. The controller controls an output device to guide a user to oppose a first imaging device of the first imaging device and a second imaging device arranged to have symmetry with respect to a virtual camera set for a display. The controller acquires a teacher image including the user opposing the first imaging device from the first imaging device. The controller performs learning processing of viewpoint conversion of the second imaging device to correspond to a viewpoint of the virtual camera on the basis of the teacher image and the symmetry of the first imaging device and the second imaging device with respect to the virtual camera.

15 Claims, 19 Drawing Sheets

(58) Field of Classification Search
CPC ...... H04N 7/147; H04N 7/142; H04N 13/239; H04N 23/611; H04N 23/61; H04N 13/117; H04N 7/141; H04N 13/111; H04N 13/246; H04N 21/44008; G06T 2207/30201; G06T 2207/10016; G06T 2207/20084; G06T 7/70; G06V 40/161; G06V 40/171; G06V 40/18; G06V 40/165; G06V 40/172; G06V 40/168; G06V 10/82
See application file for complete search history.

(56) References Cited

U.S. PATENT DOCUMENTS

2003/0218672 A1* 11/2003 Zhang ...................... H04N 7/15 348/E7.083
2004/0227693 A1* 11/2004 Rambo .................. H04N 7/144 345/6
2005/0129325 A1* 6/2005 Wu ........................ H04N 7/144 382/254
2005/0232510 A1* 10/2005 Blake ..................... H04N 13/15 382/294
2006/0192775 A1* 8/2006 Nicholson ............... G06F 3/013 345/211
2010/0092007 A1* 4/2010 Sun ......................... G10L 25/00 381/92
2011/0149038 A1* 6/2011 Umeyama ............ H04N 13/117 348/44
2011/0193935 A1* 8/2011 Gorzynski ............. H04N 7/142 348/E7.083
2011/0316853 A1* 12/2011 Bar-Zeev ............... H04N 7/144 345/158
2012/0038742 A1* 2/2012 Robinson ................. H04N 7/15 348/E7.083
2012/0154510 A1* 6/2012 Huitema ................ H04N 7/157 348/E7.083
2012/0169838 A1* 7/2012 Sekine ..................... H04N 7/15 348/E13.001
2014/0362170 A1* 12/2014 Walker ................ H04N 19/147 348/14.08
2015/0195443 A1* 7/2015 Dal Mutto ........... H04N 5/2628 348/211.11
2015/0310259 A1 10/2015 Lau et al.
2016/0050391 A1* 2/2016 Schultz ............... H04L 65/1083 348/14.07
2016/0057391 A1* 2/2016 Block ................. H04L 12/1822 348/14.07
2016/0134803 A1* 5/2016 Deng ................... H04N 23/631 348/222.1
2016/0323540 A1* 11/2016 Nilsson .................. G06V 20/46
2017/0150048 A1* 5/2017 Tokutake ............... H04N 23/80
2018/0077383 A1* 3/2018 Akao ...................... H04M 9/00
2018/0077438 A1* 3/2018 Hansen .............. H04N 21/4223
2019/0373214 A1* 12/2019 Gurr ...................... H04N 23/62
2020/0151427 A1* 5/2020 Kimura .................. G06V 40/18
2021/0105441 A1* 4/2021 Gasior ................... H04N 23/62
2021/0344890 A1* 11/2021 Namba ................ H04N 13/117
2021/0405865 A1* 12/2021 Faulkner ................ H04N 7/147
2022/0086390 A1* 3/2022 Erna ................... H04M 1/0264
2025/0030816 A1* 1/2025 Yang .................... G06V 40/168

FOREIGN PATENT DOCUMENTS

WO 2016/158014 A1 10/2016
WO 2018/225518 A1 12/2018

* cited by examiner

| COMBINATION NUMBER | STUDENT IMAGING DEVICE | INPUT IMAGING DEVICE | TEACHER IMAGING DEVICE |
|---|---|---|---|
| #1 | ID#1 | ID#4 | ID#2 |
| #2 | ID#6 | ID#4 | ID#7 |
| #3 | ID#3 | ID#5 | ID#2 |
| #4 | ID#8 | ID#5 | ID#7 |
| #5 | ID#1 | ID#2 | ID#4 |
| #6 | ID#3 | ID#2 | ID#5 |
| #7 | ID#6 | ID#7 | ID#4 |
| #8 | ID#8 | ID#7 | ID#5 |
| #9 | ID#2 | ID#3 | ID#4 |
| #10 | ID#2 | ID#1 | ID#5 |
| #11 | ID#7 | ID#8 | ID#4 |
| #12 | ID#7 | ID#6 | ID#5 |

FIG.10

| COMBINATION NUMBER | STUDENT IMAGING DEVICE | INPUT IMAGING DEVICE | TEACHER IMAGING DEVICE |
| --- | --- | --- | --- |
| #13 | ID#2 | ID#5 | ID#1 |
| | ID#4 | ID#7 | |
| #14 | ID#2 | ID#4 | ID#3 |
| | ID#5 | ID#7 | |
| #15 | ID#4 | ID#2 | ID#6 |
| | ID#7 | ID#5 | |
| #16 | ID#5 | ID#2 | ID#8 |
| | ID#7 | ID#4 | |
| #17 | ID#1 | ID#2 | ID#4 |
| | ID#2 | ID#3 | |
| #18 | ID#2 | ID#1 | ID#5 |
| | ID#3 | ID#2 | |
| #19 | ID#6 | ID#7 | ID#4 |
| | ID#7 | ID#8 | |
| #20 | ID#7 | ID#6 | ID#5 |
| | ID#8 | ID#7 | |
| #21 | ID#1 | ID#4 | ID#2 |
| | ID#4 | ID#6 | |
| #22 | ID#4 | ID#1 | ID#7 |
| | ID#6 | ID#4 | |
| #23 | ID#3 | ID#5 | ID#2 |
| | ID#5 | ID#8 | |
| #24 | ID#5 | ID#3 | ID#7 |
| | ID#8 | ID#5 | |
| #25 | ID#1 | ID#4 | ID#2 |
| | ID#3 | ID#5 | |
| #26 | ID#6 | ID#4 | ID#7 |
| | ID#8 | ID#5 | |
| #27 | ID#1 | ID#2 | ID#4 |
| | ID#6 | ID#7 | |
| #28 | ID#3 | ID#2 | ID#4 |
| | ID#8 | ID#7 | |

FIG.14

START → END

| COMBINATION NUMBER | HEAD POSE | EXPRESSION | TIME(frame) |
|---|---|---|---|
| #13 | POSE 1 | EXPRESSION 1 | 60 |
| | | EXPRESSION 2 | 60 |
| | POSE 2 | EXPRESSION 3 | 40 |
| | | EXPRESSION 4 | 40 |
| | POSE 3 | EXPRESSION 5 | 50 |
| | | EXPRESSION 6 | 50 |
| #16 | POSE 4 | EXPRESSION 3 | 60 |
| | | EXPRESSION 4 | 60 |
| | | EXPRESSION 2 | 40 |
| | POSE 5 | EXPRESSION 1 | 40 |
| | POSE 1 | EXPRESSION 6 | 50 |
| | | EXPRESSION 5 | 50 |

| POSE 1 | POSE 2 | POSE 3 | POSE 4 | POSE 5 |
|---|---|---|---|---|
| | | | | |

FIG.16

| EXPRESSION 1 | JOY |
|---|---|
| EXPRESSION 2 | ANGER |
| EXPRESSION 3 | GRIEF |
| EXPRESSION 4 | PLEASURE |
| EXPRESSION 5 | EXPRESSIONLESS |
| EXPRESSION 6 | UTTERANCE OF DESIGNATED SENTENCE 1 |
| EXPRESSION 7 | UTTERANCE OF DESIGNATED SENTENCE 2 |

⋮

INFORMATION PROCESSING APPARATUS, INFORMATION PROCESSING METHOD, AND RECORDING MEDIUM

CROSS REFERENCE TO RELATED APPLICATIONS

This application is a U.S. National Phase of International Patent Application No. PCT/JP2023/007501 filed on Mar. 1, 2023, which claims priority benefit of Japanese Patent Application No. JP 2022-046934 filed in the Japan Patent Office on Mar. 23, 2022. Each of the above-referenced applications is hereby incorporated herein by reference in its entirety.

FIELD

The present disclosure relates to an information processing apparatus, an information processing method, and a recording medium.

BACKGROUND

Conventionally, a telecommunication system is used in which users in remote places communicate with each other as if the users are facing each other. In general, in the telecommunication system, arrangement of an imaging device and a display device can be limited. Therefore, the visual lines of the users do not coincide with each other, and for example, eye contact is not established in some cases.

There is known a technique of performing viewpoint conversion of captured images such that the visual lines of the users coincide with each other. The telecommunication system generates an image that appears to be captured by imaging a first user from a virtual imaging position on the basis of a captured image obtained by imaging the first user. Here, the virtual imaging position is a viewpoint position of a second user displayed on the display device.

That is, the telecommunication system performs viewpoint conversion on the captured image obtained by capturing the first user by the imaging device arranged around the display device as if the captured image is captured from the viewpoint position of the second user displayed on the display device. The telecommunication system displays the captured image subjected to viewpoint conversion on the display device of the second user.

In this manner, the telecommunication system can coincide with the line-of-sights of the first user and the second user.

CITATION LIST

Patent Literature

Patent Literature 1: WO 2018/225518 A

SUMMARY

Technical Problem

The telecommunication system described above performs viewpoint conversion by using a plurality of captured images using, for example, a viewpoint interpolation technique. As a technique for performing viewpoint conversion using a plurality of captured images, for example, a viewpoint conversion technique using machine learning is known.

When the viewpoint conversion of the captured image is performed by using machine learning, if the telecommunication system learns the viewpoint conversion specialized for a specific person, there is a possibility that the accuracy of the viewpoint conversion for an unspecified person is deteriorated. That is, the viewpoint conversion learned specifically for a specific person deteriorates versatility.

On the other hand, if the telecommunication system learns the viewpoint conversion versatilely, in other words, without specifying a person, there is a possibility that the accuracy of the viewpoint conversion for a specific person is deteriorated. That is, there is a possibility that the accuracy of the viewpoint conversion learned for an unspecified person decreases depending on the person to be converted.

Therefore, the present disclosure provides a mechanism capable of further improving accuracy of viewpoint conversion for a specific person in viewpoint conversion for an unspecified person.

Note that the above problem or object is merely one of a plurality of problems or objects that can be solved or achieved by a plurality of embodiments disclosed in the present specification.

Solution to Problem

An information processing apparatus of the present disclosure includes a controller. The controller controls an output device to guide a user to oppose a first imaging device of the first imaging device and a second imaging device arranged to have symmetry with respect to a virtual camera set for a display. The controller acquires a teacher image including the user opposing the first imaging device from the first imaging device. The controller performs learning processing of viewpoint conversion of the second imaging device to correspond to a viewpoint of the virtual camera on the basis of the teacher image and the symmetry of the first imaging device and the second imaging device with respect to the virtual camera.

BRIEF DESCRIPTION OF DRAWINGS

FIG. 10 is a table illustrating an example of combinations of imaging devices used for the personalized learning according to an embodiment of the present disclosure.

FIG. 14 is a diagram illustrating an example of a learning data acquisition plan according to an embodiment of the present disclosure.

FIG. 15 is a table illustrating an example of a head pose according to an embodiment of the present disclosure.

FIG. 16 is a table illustrating an example of an expression according to an embodiment of the present disclosure.

DESCRIPTION OF EMBODIMENTS

Hereinafter, embodiments of the present disclosure will be described in detail with reference to the accompanying drawings. Note that, in the present specification and the drawings, constituent elements having substantially the same functional configuration are denoted by the same reference signs to omit redundant description.

Furthermore, in the present specification and the drawings, some specific values are indicated and described, but the values are merely examples, and other values may be applied.

In addition, in the present specification and the drawings, some similar constituent elements of the embodiments are distinguished by adding at least either different alphabets or numbers after the same reference signs. For example, a plurality of configurations having substantially the same functional configuration are distinguished as imaging devices 300A_1, 300A_2, and 300B_1 as necessary. However, when it is not particularly necessary to distinguish each of a plurality of constituent elements having substantially the same functional configuration, only the same reference sign is attached. For example, when it is not necessary to distinguish the imaging devices 300A_1 and 300A_2, the imaging devices are simply referred to as imaging devices 300A. For example, when it is not necessary to distinguish the imaging devices 300A_1, 300A_2, and 300B_1, the imaging devices are simply referred to as imaging devices 300.

One or a plurality of embodiments (including examples and modifications) described below can each be implemented independently. On the other hand, at least some of the plurality of embodiments described below may be appropriately combined with at least some of the other embodiments. The plurality of embodiments can include novel features different from each other. Therefore, the plurality of embodiments can contribute to solving different objects or problems, and can exhibit different effects.

1. INTRODUCTION

1.1. Outline Configuration Example of Information Processing System

Figure 1:
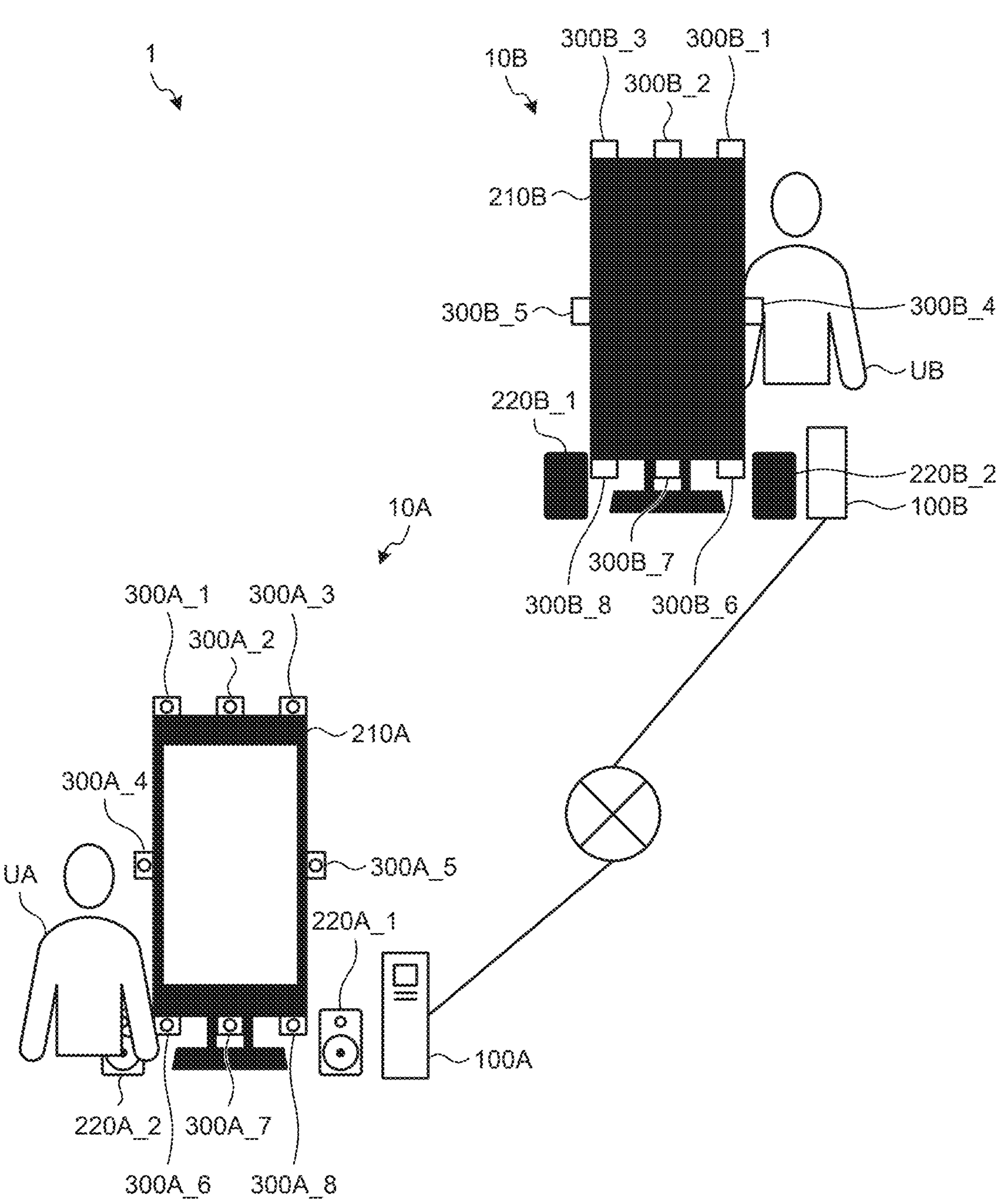
FIG. 1 is a diagram for describing an outline of a telecommunication system according to an embodiment of the present disclosure.

FIG. 1 is a diagram for describing an outline of a telecommunication system 1 according to an embodiment of the present disclosure. The telecommunication system 1 includes information processing systems 10A and 10B. The information processing systems 10A and 10B are connected via a network.

The telecommunication system 1 provides a telecommunication service to a user UA who uses the information processing system 10A and a user UB who uses the information processing system 10B. The telecommunication service is a service that provides interactive communication to the users UA and UB at remote locations.

The information processing system 10A illustrated in FIG. 1 includes an information processing apparatus 100A, a display 210A, speakers 220A_1 and 220A_2, and imaging devices 300A_1 to 300A_8.

(Display)

The display 210A is a device that presents image information to the user UA in accordance with an instruction from the information processing apparatus 100A. The display 210A can display, for example, a received image received from the information processing system 10B. The display 210A can display, for example, a captured image captured by the imaging device 300A_1 to 300A_8.

The display 210A can display, for example, a UI image generated by the information processing apparatus 100A other than the received image and the captured image. The display 210A can display at least two of the received image, the captured image, or the UI image in combination.

(Speaker)

The speakers 220A_1 and 220A_2 are devices that present sound information to the user UA in accordance with an instruction from the information processing apparatus 100A. The speakers 220A_1 and 220A_2 can output, for example, voice information of the user UB. The voice information of the user UB is acquired from the information processing system 10B, for example.

The speakers 220A_1 and 220A_2 can output, for example, voice information of the user UA. The voice information of the user UA can be acquired from, for example, a microphone (not illustrated) included in the information processing system 10A.

The speakers 220A_1 and 220A_2 can output sound information such as music, for example, other than the voice information of the users UA and UB. The speakers 220A_1 and 220A_2 can superimpose and output a plurality of pieces of sound information.

Note that the speaker 220A_1 may output the same sound information as the speaker 220A_2 or may output sound information different from the speaker 220A_2.

The arrangement of the speakers 220A_1 and 220A_2 is not limited to the example in FIG. 1. For example, the speakers 220A_1 and 220A_2 may be disposed around the display 210A, or may be disposed at a position away from the display 210A.

The number of speakers 220A is not limited to two. The number of speakers 220A may be one or three or more. Furthermore, the speaker 220A may be built in the display 210A or the information processing apparatus 100A.

The display 210A and the speaker 220A are also collectively referred to as an output device.

(Imaging Device)

The imaging devices 300A_1 to 300A_8 are, for example, cameras that are disposed around the display 210A and image a periphery of the display 210A. The imaging devices 300A_1 to 300A_8 image the user UA, for example. The captured image captured by the imaging device 300A may be a moving image or a still image.

The imaging devices 300A_1 to 300A_8 may be built in the display 210A or may be disposed around the display 210A as external cameras. Furthermore, the number of imaging devices 300A is not limited to eight. The number of imaging devices 300A is only required to be at least two, and may be seven or less or nine or more.

(Information Processing Apparatus)

The information processing apparatus 100A controls each device included in the information processing system 10A. For example, the information processing apparatus 100A generates information to be output from the output device. The information processing apparatus 100A communicates with the information processing system 10B via a network.

In the example in FIG. 1, the information processing system 10B is configured similarly to the information processing system 10A. Note that the information processing system 10B may have a configuration different from the configuration of the information processing system 10A. For example, the number, arrangement, and the like of the speakers 220B may be different from those of the information processing system 10A. In addition, the number, arrangement, and the like of the imaging device 300B may be different from those of the information processing system 10A as long as there is symmetry to be described later.

1.2. Problems

When users U perform telecommunication by using the captured image of the imaging device 300 disposed around the display 210, the line-of-sights of the users U are difficult to coincide with each other.

Figure 2:
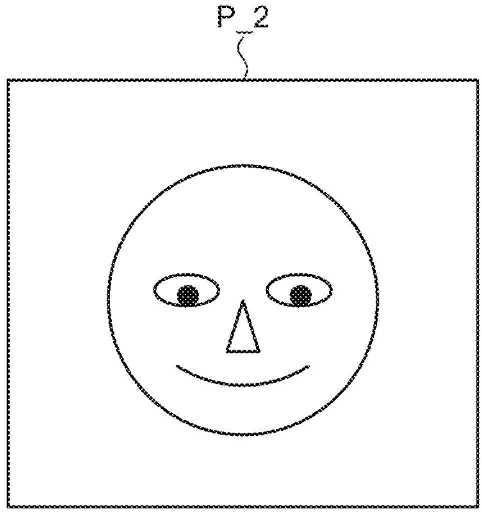
FIG. 2 is a diagram illustrating an example of a captured image captured by an imaging device.
Figure 3:
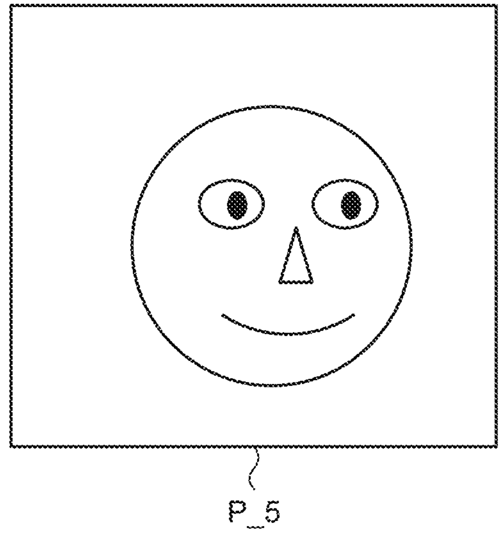
FIG. 3 is a diagram illustrating an example of a captured image captured by the imaging device.

FIGS. 2 and 3 are diagrams each illustrating an example of a captured image captured by the imaging device 300. A captured image P_2 illustrated in FIG. 2 is an image captured by the imaging device 300 (for example, the imaging device 300A_2 (see FIG. 1)) disposed on an upper part of the display 210. A captured image P_5 illustrated in FIG. 3 is an image captured by the imaging device 300 (for example, the imaging device 300A_5 (see FIG. 1)) disposed on a side of the display 210.

When the user U performs communication by interactive telepresence, a video of a partner is displayed on the display 210. Therefore, the user U views the display 210 and communicates with the partner.

At this time, when the information processing system 10 images the user U with the imaging device 300 disposed around the display 210, a video in which the line of sight of the user U faces obliquely is imaged as illustrated in FIGS. 2 and 3. When the video is displayed on the display 210 of the partner, it becomes difficult for the partner to coincide with the line of sight with the user U, and it becomes difficult to make a natural eye contact.

On the other hand, if the information processing system 10 can image the user U from the front, the partner can easily coincide with the line-of-sight with the user U, and more easily make a natural eye contact.

However, since the display 210 is disposed in front of the user U, it is difficult for the information processing system 10 to capture an image from the front of the user U. For example, when the imaging device 300 is disposed in front of the display 210, a part of the display 210 is hidden by the imaging device 300, and the partner cannot be seen. There is a possibility that arranging the imaging device 300 in front of the display 210 in this manner prevents smooth communication.

Here, for example, a method of imaging the user U from the front of the user U where the display 210 is disposed by using a half mirror (not illustrated) is conceivable. For example, the half mirror is disposed obliquely between the display 210 and the user U. The user U visually recognizes the video projected by the display 210 via the half mirror. A camera disposed on an upper part of the half mirror images the user U reflected on the half mirror.

In this manner, by using the half mirror, the camera can image the user U confronting the display 210 without disturbing a viewing experience of the user U. However, when the half mirror is used, there is a problem that the information processing system 10 becomes large in scale.

Furthermore, a method of imaging the user U from the front of the user U where the display 210 is disposed by using the display 210 as a transmissive display is conceivable. In this case, the camera is disposed on a back surface of the display 210.

In this manner, by arranging the camera on the back surface of the display 210, the camera can image the user U confronting the display 210. However, when the camera is disposed on the back surface of the display 210, there is a possibility that the performance of the display 210 is deteriorated, for example, the light amount of the display 210 becomes small.

On the other hand, as illustrated in FIG. 1, as a method of imaging the user U from the front of the display 210 by using the imaging device 300 disposed around the display 210, there is a method of converting the viewpoint of the captured image captured by the imaging device 300.

In this case, the information processing system 10 performs, for example, viewpoint conversion processing on the captured image captured by the imaging device 300 by using machine learning, and generates a converted image captured from substantially in the center of the display 210.

However, when the size of the display 210 increases, the distance between the imaging device 300 and the substantially center of the display 210 increases. In this case, a conversion angle of view for converting the captured image into a converted image becomes large, and there has been a problem that it is difficult to convert the captured image with high accuracy.

For example, in a case where the user U who uses the information processing system 10 is specified in advance, the information processing system 10 can perform learning (hereinafter, also referred to as personalized learning) specialized for the specified user U by acquiring in advance a student image and a teacher image related to the user U. As a result, the information processing system 10 can improve conversion accuracy of the captured image including the specific user U.

However, depending on a use case of the telecommunication system 1, it is difficult to specify the user U in advance in some cases. In this manner, even when it is difficult to specify the user U in advance and the student image and the teacher image necessary for learning cannot be acquired in advance, it is desirable to further improve the conversion accuracy of the captured image including the user U.

In this manner, when performing the viewpoint conversion as if the captured image is captured from the front of the display 210 (for example, substantially center), the information processing system 10 desirably performs the viewpoint conversion with higher accuracy.

1.3. Outline of Proposed Technique

Therefore, the information processing system 10 according to an embodiment of the present disclosure uses the symmetry of the arrangement of the imaging device 300 to acquire a student image (learning data) and a teacher image (correct answer data). As a result, in the telecommunication system 1 used by an unspecified user U, the information processing system 10 can perform personalized learning specialized for the user U who uses the system.

Figure 4:
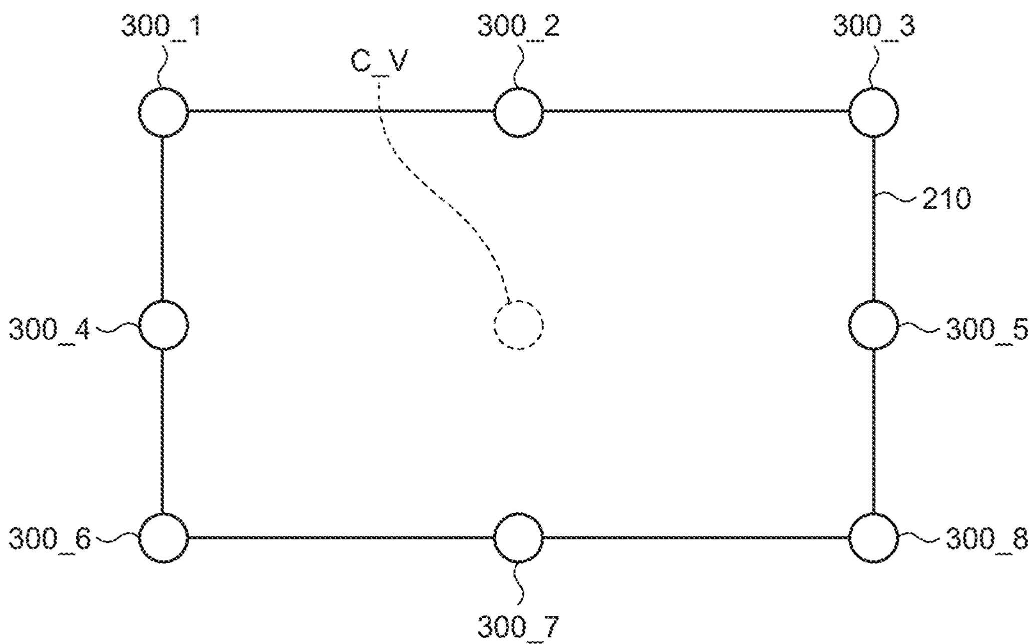
FIG. 4 is a diagram illustrating an arrangement example of the imaging device according to an embodiment of the present disclosure.
Figure 5:
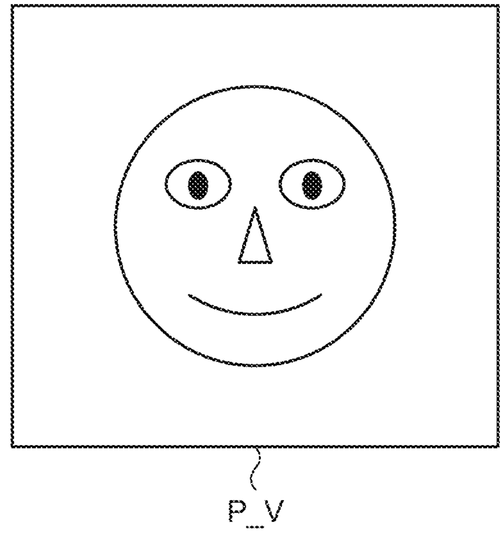
FIG. 5 is a diagram illustrating an example of a converted image generated by viewpoint conversion processing by an information processing system according to an embodiment of the present disclosure.

First, an arrangement example of the imaging device 300 will be described with reference to FIG. 4. FIG. 4 is a diagram illustrating an arrangement example of the imaging device 300 according to an embodiment of the present disclosure. FIG. 4 schematically illustrates a positional relationship between the imaging device 300 and the display 210. FIG. 5 is a diagram illustrating an example of a converted image generated by viewpoint conversion processing by the information processing system 10 according to an embodiment of the present disclosure.

As illustrated in FIG. 4, eight imaging devices 300_1 to 300_8 are disposed around the display 210. Here, the information processing system 10 converts the captured image captured by the imaging devices 300_1 to 300_8 into a converted image P_V (see FIG. 5) captured by a virtual camera C_V located substantially in the center of the display 210. That is, the information processing system 10 converts the captured image into the converted image P_V viewed from a viewpoint substantially in the center of the display 210. For example, as illustrated in FIG. 5, the converted image P_V is an image obtained by imaging the user U from the front.

Note that the virtual camera C_V does not actually exist. The information processing system 10 executes the viewpoint conversion processing by using the captured image captured by the imaging devices 300_1 to 300_8 to generate a virtual image as if captured by the virtual camera C_V.

Eight imaging devices 300_1 to 300_8 illustrated in FIG. 4 are arranged to have symmetry with respect to the virtual camera C_V. For example, the imaging device 300_1 and the imaging device 300_2 are arranged in accordance with a relative positional relationship between the imaging device 300_4 and the virtual camera C_V. The imaging devices 300_1, 300_2, and 300_4 are arranged in accordance with a relative positional relationship between the imaging devices 300_5 and 300_7 and the virtual camera C_V.

In this manner, the imaging device 300 (for example, the imaging device 300_5) is arranged such that the relative positional relationship with the virtual camera C_V is the same as the relative positional relationship of the other imaging devices 300 (for example, imaging devices 300_6 and 300_7).

In the example in FIG. 4, each of the imaging devices 300_1, 300_3, 300_6, and 300_8 is disposed at a corner of the display 210. Each of the imaging devices 300_2, 300_4, 300_5, and 300_7 is disposed on an end side of the display 210.

In the present embodiment, such an arrangement of the imaging device 300 corresponding to the relative positional relationship with the virtual camera C_V is described as an arrangement having symmetry. The imaging device 300 according to the present embodiment is arranged to have symmetry with respect to the virtual camera C_V in accordance with the relative relationship with the virtual camera C_V.

By using the imaging device 300 arranged in this manner, the information processing system 10 acquires a student image and a teacher image including the user U, and performs viewpoint conversion learning specialized for the user U.

Figure 6:
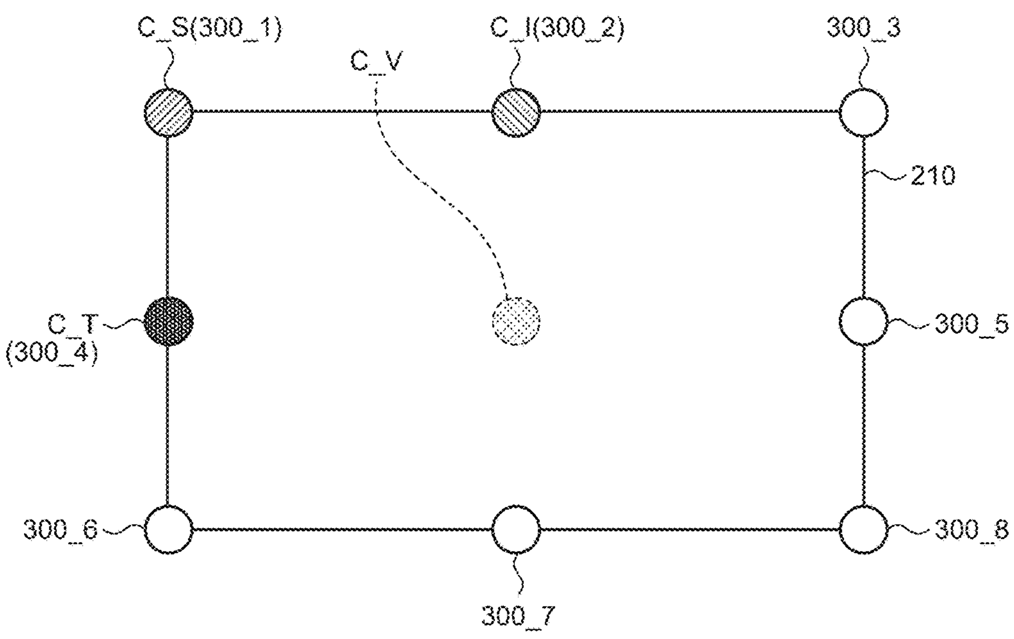
FIG. 6 is a diagram for describing an example of acquisition of a student image and a teacher image according to an embodiment of the present disclosure.

FIG. 6 is a diagram for describing an example of acquisition of a student image and a teacher image according to an embodiment of the present disclosure. Here, the information processing system 10 performs personalized learning for converting a captured image of the imaging device 300_2 (an example of a third imaging device, and hereinafter, also referred to as input imaging device C_I) into the converted image P_V captured by the virtual camera C_V.

In this case, the information processing system 10 sets the imaging device 300_4 as an imaging device for acquiring a teacher image (an example of a first imaging device, and hereinafter referred to as a teacher imaging device C_T). The information processing system 10 sets a captured image captured by the teacher imaging device C_T as a teacher image (teacher data) P_T.

The information processing system 10 sets the imaging device 300_1 as an imaging device for acquiring a student image (an example of a second imaging device, and hereinafter referred to as a student imaging device C_S). The information processing system 10 sets a captured image captured by the student imaging device C_S as a student image (student data) P_S.

In the information processing system 10, the teacher imaging device C_T and the student imaging device C_S are arranged so as to have symmetry with respect to the virtual camera C_V set for the display 210.

At this time, the information processing system 10 controls the output device to guide the user U to confront (oppose) the teacher imaging device C_T. Here, the user U confronting (opposing) the teacher imaging device C_T means that the user U is located in front of the teacher imaging device C_T. Specifically, the user U confronting (opposing) the teacher imaging device C_T means, for example, that the user U is located substantially in the center of the angle of view of the teacher imaging device C_T.

The information processing system 10 acquires the teacher image P_T including the user U confronting (opposing) the teacher imaging device C_T from the teacher imaging device C_T. The information processing system 10 acquires the student image P_S including the user U confronting (opposing) the teacher imaging device C_T from the student imaging device C_S.

On the basis of the teacher image and the symmetry of the teacher imaging device C_T and the student imaging device C_S with the virtual camera C_V, the information processing system 10 performs conversion processing to correspond to the viewpoint of the virtual camera C_V and performs learning processing of viewpoint conversion of the student imaging device C_S. By using the student image P_S and the teacher image P_T, the information processing system 10 learns conversion processing of performing viewpoint conversion of the captured image captured by the input imaging device C_I into the converted image P_V from the viewpoint set for the display 210.

That is, by using the student image P_S and the teacher image P_T, the information processing system 10 performs personalized learning of conversion processing of performing viewpoint conversion into the converted image P_V as if the captured image captured by the input imaging device C_I is captured from the virtual camera C_V. Hereinafter, the student image P_S and the teacher image P_T are also collectively referred to as learning image.

Here, the input imaging device C_I is disposed at a position corresponding to a relative position between the teacher imaging device C_T and the student imaging device C_S. Specifically, the input imaging device C_I is disposed such that a relative position between the input imaging device C_I and the virtual camera C_V is a position corresponding to a relative position between the teacher imaging device C_T and the student imaging device C_S.

Figure 7:
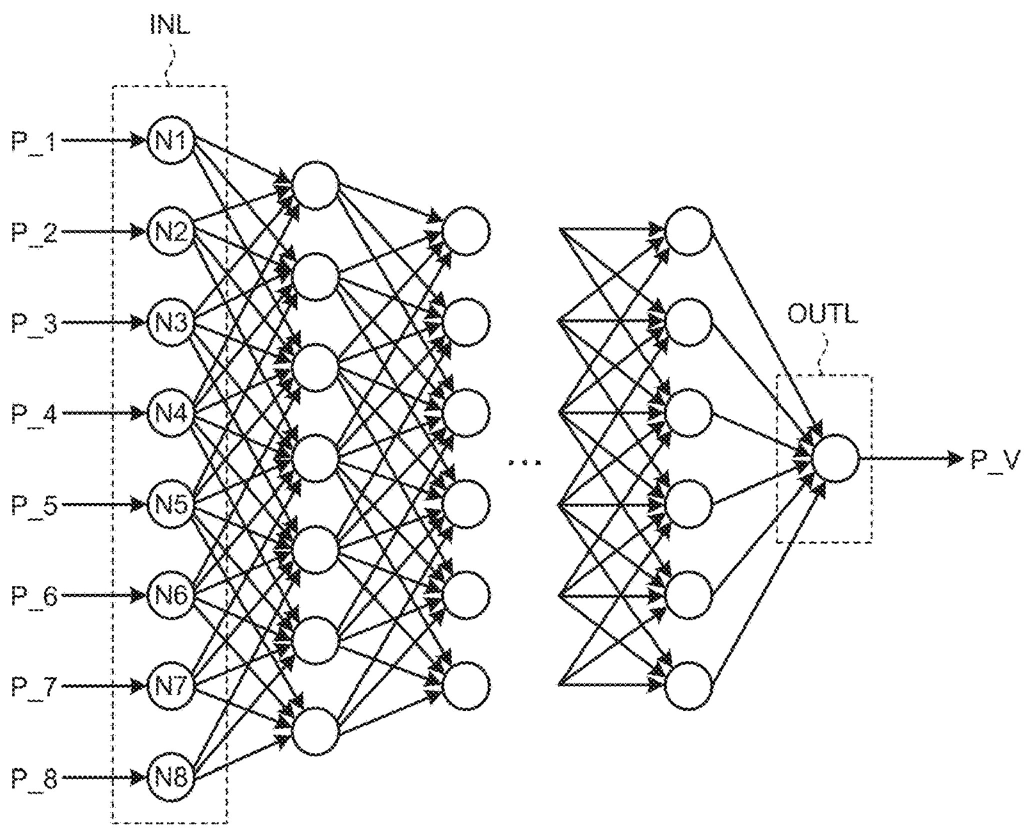
FIG. 7 is a diagram illustrating an example of a network structure of a conversion model used for viewpoint conversion by the information processing system according to an embodiment of the present disclosure.
Figures 8, 9:
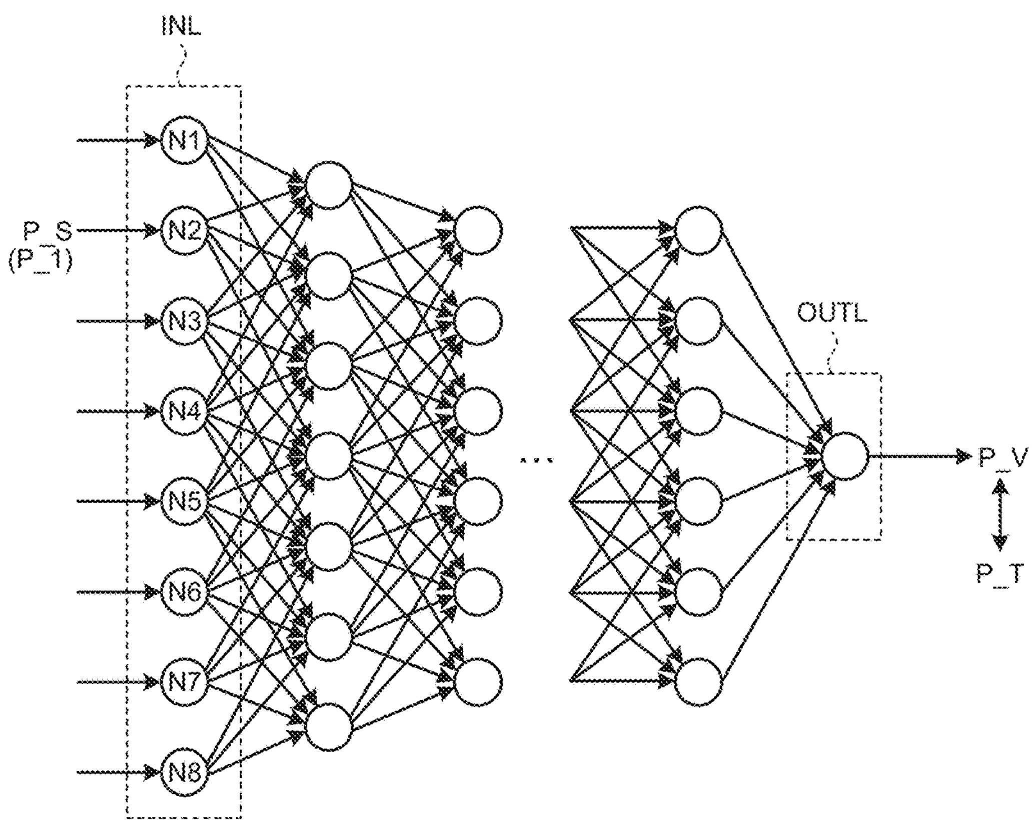
FIG. 8 is a diagram for describing an example of personalized learning executed by the information processing system according to an embodiment of the present disclosure.
FIG. 9 is a table illustrating an example of combinations of imaging devices used for the personalized learning according to an embodiment of the present disclosure.

Here, an example of the personalized learning performed by the information processing system 10 will be described with reference to FIGS. 7 and 8. FIG. 7 is a diagram illustrating an example of a network structure of a conversion model used for viewpoint conversion processing by the information processing system 10 according to an embodiment of the present disclosure. FIG. 8 is a diagram for describing an example of the personalized learning executed by the information processing system 10 according to an embodiment of the present disclosure.

FIG. 7 illustrates an example of a network for the conversion model. The network illustrated in FIG. 7 includes a plurality of (multilayer) intermediate layers between an input layer INL and an output layer OUTL.

In the example in FIG. 7, the input layer INL includes eight input nodes N1 to N8. Captured images P_1 to P_8 captured by the imaging devices 300_1 to 300_8 are input to the input nodes N1 to N8, respectively.

The output layer OUTL includes one output node. The converted image P_V after viewpoint conversion is output from the output node.

Parameters of the conversion model having the network structure illustrated in FIG. 7 are learned in advance in a form in which an individual is not specified. The information processing system 10 performs additional learning (personalized learning) that specifies the user U for the conversion model learned for an unspecified user U.

In FIG. 8, the information processing system 10 performs personalized learning with the imaging device 300_2 as the input imaging device C_I, the imaging device 300_1 as the student imaging device C_S, and the imaging device 300_4 as the teacher imaging device C_T.

In this case, the information processing system 10 acquires the converted image P_V from the output node by inputting the student image P_S captured by the student imaging device C_S to the input node N2. Here, the input node N2 is a node to which the captured image P_2 captured by the imaging device 300_2 which is the input imaging device C_I is input.

Note that the captured image is not input to the input nodes N1 and N3 to N8 except for the input node N2 to which the student image P_S is input. In this manner, the conversion model according to the present embodiment is a model that can output the converted image P_V even when the captured image is not input to some of the input nodes N.

Alternatively, the information processing system 10 may input a black image (an image in which all pixels are black) instead of the captured image to the input nodes N1 and N3 to N8 except for the input node N2 to which the student image P_S is input. In this case, the conversion model is configured to output the converted image P_V even when the black image is input to some of the input nodes N.

The information processing system 10 updates the parameters of the conversion model in accordance with the converted image P_V which is the output of the conversion model and the teacher image P_T captured by the teacher imaging device 300_4. In this manner, the information processing system 10 performs personalized learning (relearning) on the conversion model targeted for the unspecified user U.

Note that, here, the conversion model has a neural network structure, but the structure of the conversion model is not limited to a neural network structure. The conversion model is only required to receive the captured images P_1 to P_8 as input and output the converted image P_V. The conversion model can have various structures such as a convolutional neural network (CNN), a deep neural network (DNN), a recurrent neural network (RNN), and a generative adversarial network (GAN).

Here, the information processing system 10 sets the imaging device 300_2 as the input imaging device C_I, the imaging device 300_1 as the student imaging device C_S, and the imaging device 300_4 as the teacher imaging device C_T. However, the combination of the input imaging device C_I, the student imaging device C_S, and the teacher imaging device C_T is not limited to the above.

FIGS. 9 and 10 are tables illustrating an example of combinations of the imaging devices 300 used for the personalized learning according to an embodiment of the present disclosure. The combination of the imaging devices 300 used for personalized learning means a combination of the student imaging device C_S, the input imaging device C_I, and the teacher imaging device C_T.

In FIGS. 9 and 10, the imaging device 300_1 to 300_8 are distinguished by IDs (ID #1 to ID #8) for identifying the imaging device 300_1 to 300_8. The numbers of the IDs (ID #1 to ID #8) correspond to the numbers at the ends of the imaging devices 300_1 to 300_8.

In FIG. 9, the information processing system 10 selects one imaging device 300 as the student imaging device C_S. For example, the information processing system 10 selects the imaging device 300_6 as the student imaging device C_S, the imaging device 300_4 as the input imaging device C_I, and the imaging device 300_7 as the teacher imaging device C_T.

In FIG. 10, the information processing system 10 selects two imaging devices 300 as the student imaging devices C_S. For example, the information processing system 10 selects the imaging devices 300_2 and 300_4 as the student imaging device C_S, the imaging devices 300_5 and 300_7 as the input imaging device C_I, and the imaging device 300_1 as the teacher imaging device C_T.

When the imaging devices 300_1 to 300_8 are arranged around the display 210 as illustrated in FIG. 3, the information processing system 10 can select a combination of the imaging devices 300 to be used for personalized learning from 28 combinations as illustrated in FIGS. 9 and 10.

The information processing system 10 can select at least one combination among the combinations illustrated in FIGS. 9 and 10 as a combination of the imaging devices 300 used for personalized learning. When a plurality of combinations is selected, the information processing system 10 acquires learning images while sequentially switching the combinations. The information processing system 10 sequentially guides the user U to the next teacher imaging device C_T to acquire the learning image.

Note that, as illustrated in FIGS. 9 and 10, a number (hereinafter also referred to as a combination number) is assigned to each combination of the imaging devices 300. The combination number is referred to at the time of planning personalized learning to be described later.

In this manner, the information processing system 10 executes personalized learning by using the plurality of imaging devices 300_1 to 300_8 arranged around the display 210.

At this time, the information processing system 10 prompts the user U to move to an appropriate position in order to acquire an appropriate learning image. The appropriate position is a position where the user U confronts the teacher imaging device C_T.

The information processing system 10 performs learning of viewpoint conversion in which a confronting image of the user U captured by the teacher imaging device C_T is set as a teacher image and a non-confronting image of the user U captured by the student imaging device C_S is set as a student image. At this time, by using the symmetry of the arrangement of the imaging device 300, the information processing system 10 can learn a conversion model for generating the converted image P_V viewed substantially from the center of the display 210 in which the imaging device 300 is not actually disposed, for example.

In this manner, the information processing system 10 according to an embodiment of the present disclosure performs learning specialized for the user U as an individual. As a result, the information processing system 10 can perform higher-quality viewpoint conversion on the face of the user U as an individual in versatility processing that does not specify the user U.

Furthermore, by applying the personalized learning to the telecommunication system 1, the users UA and UB can make a natural eye contact while confronting each other. As described above, the telecommunication system 1 according to an embodiment of the present disclosure can provide a higher quality telepresence service to the user U.

In addition, the information processing system 10 performs additional learning (relearning) specialized for the user U on the conversion model learned in advance. Therefore, the information processing system 10 can perform relearning with fewer learning images than when learning specialized for the user U is performed from the beginning.

For example, the information processing system 10 can perform relearning with a smaller number of samples (the number of student images) by using a learning model such as one-shot learning (few-shot learning).

The information processing system 10 can shorten the time for performing personalized learning by performing personalized learning with a small number of learning images. Therefore, the information processing system 10 does not need to perform personalized learning in advance, and can perform personalized learning online when the user U performs telecommunication. For example, the information processing system 10 can perform personalized learning when the user U uses the telecommunication system 1 for the first time, such as when the user U performs user use registration.

Note that, here, the information processing system 10 includes eight imaging devices 300_1 to 300_8, but the number of imaging devices 300 is not limited to eight. The information processing system 10 is only required to include the imaging device 300 that functions as the student imaging device C_S, the teacher imaging device C_T, and the input imaging device C_I.

For example, it is assumed that the information processing system 10 includes three imaging devices 300_2, 300_4, and 300_6 (see FIG. 4). In this case, the information processing system 10 can perform personalized learning with the imaging device 300_4 as the student imaging device C_S, the imaging device 300_6 as the teacher imaging device C_T, and the imaging device 300_2 as the input imaging device C_I.

For example, it is assumed that the information processing system 10 includes three imaging devices 300_1, 300_2, and 300_4 (see FIG. 4). In this case, the information processing system 10 can perform personalized learning with the imaging device 300_1 as the student imaging device C_S, the imaging device 300_4 as the teacher imaging device C_T, and the imaging device 300_2 as the input imaging device C_I.

In addition, in this case, the information processing system 10 can perform personalized learning with the imaging device 300_1 as the student imaging device C_S, the imaging device 300_2 as the teacher imaging device C_T, and the imaging device 300_4 as the input imaging device C_I.

In this manner, depending on the arrangement of the imaging devices 300, the information processing system 10 can perform different personalized learning using the same imaging device 300. In this case, the information processing system 10 can execute the viewpoint conversion processing with higher accuracy with a smaller number of imaging devices 300.

Note that, for example, when the information processing system 10 selects one imaging device 300 as the teacher imaging device C_T and the input imaging device C_I, the information processing system 10 can perform personalized learning using the two imaging devices 300.

Figure 11:
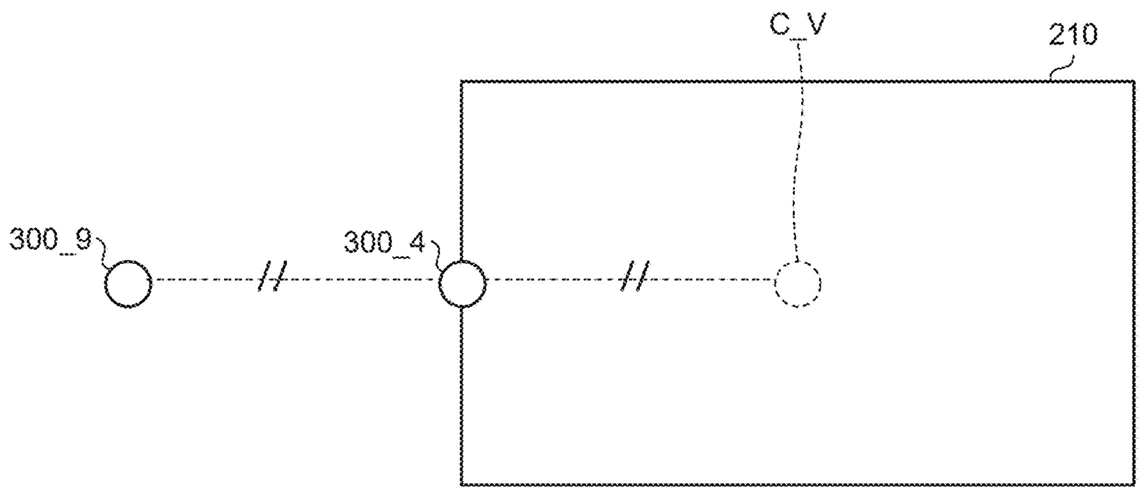
FIG. 11 is a diagram illustrating another arrangement example of the imaging device according to an embodiment of the present disclosure.

FIG. 11 is a diagram illustrating another arrangement example of the imaging device 300 according to an embodiment of the present disclosure. FIG. 11 schematically illustrates a positional relationship between the imaging device 300 and the display 210.

As illustrated in FIG. 11, here, it is assumed that the information processing system 10 includes imaging devices 300_4 and 300_9. The imaging device 300_9 is disposed outside the display 210. The imaging device 300_9 is disposed such that the relative positional relationship between the imaging device 300_9 and the imaging device 300_4 is the same as a relative positional relationship between the imaging device 300_4 and the virtual camera C_V.

In the example in FIG. 11, the imaging device 300_9 is disposed on a straight line connecting the imaging device 300_4 and the virtual camera C_V such that the distance between the imaging device 300_9 and the imaging device 300_4 is the same as the distance between the imaging device 300_4 and the virtual camera C_V.

In this case, the information processing system 10 can perform personalized learning with the imaging device 300_9 as the student imaging device C_S, the imaging device 300_4 as the teacher imaging device C_T, and the imaging device 300_4 as the input imaging device C_I.

In this manner, the information processing system 10 can perform personalized learning using two imaging devices by arranging the imaging devices 300 around and outside the display 210.

Note that FIG. 11 illustrates a case where the imaging device 300_9 is disposed outside the imaging device 300_4 of the display 210, that is, on the left side of the display 210, but the arrangement of the imaging device 300_9 is not limited to this case. For example, the imaging device 300_9 may be disposed outside the imaging device 300_2 of the display 210, that is, above the display 210. The imaging device 300_9 may be disposed outside the imaging device 300_8 of the display 210, that is, on the obliquely lower right side the display 210.

The number of imaging devices 300 disposed outside the display 210 is not limited to one, and may be two or more.

Note that, when the number of imaging devices 300 is large, the information processing system 10 can acquire more learning images, and the accuracy of the viewpoint conversion by the conversion model can be further improved.

The technique of the present disclosure focuses on processing of learning viewpoint conversion personalized to the user U. As described above, the information processing system 10 pre-learns a conversion model that performs viewpoint conversion that is not personalized, and additionally performs personalized learning by using coefficient data (parameters) of the conversion model pre-learned as an initial value. For example, when the conversion model is implemented by DNN, it is common to additionally perform learning. The information processing system 10 can further optimize the conversion model by the personalized learning additionally performed while taking over the characteristics of the initial value.

The conversion model is pre-learned, for example, before the telecommunication system 1 is launched. Therefore, the information processing system 10 can collect learning images without actually performing telepresence. Furthermore, the information processing system 10 can acquire a teacher image by actually arranging a learning imaging device (not illustrated) at the position of the virtual camera C_V.

When learning targeted for an unspecified user U is performed, the information processing system 10 can use a multi-view image generated by using computer graphics (CG) or the like as a learning image.

The information processing system 10 pre-learns the conversion model with the captured images P_1 to P_8 captured by the imaging devices 300_1 to 300_8 as the student image P_S and the image captured by the learning imaging device as the teacher image P_T.

Note that personalized learning is learning using symmetry of arrangement of the imaging devices 300_1 to 300_8. Therefore, as described above, when the information processing system 10 additionally performs personalized learning, not all the captured images P_1 to P_8 captured by the imaging devices 300_1 to 300_8 are input to the conversion model. For example, in the examples in FIGS. 9 and 10, one or two captured images P are input to the conversion model. In personalized learning, invalid data such as a black signal can be input to the conversion model.

Therefore, the information processing system 10 learns a conversion model that allows input of invalid data in pre-learning. The information processing system 10 performs pre-learning assuming that additional learning in which some input data is invalid data is performed.

That is, when invalid data is input as part of the input data, the information processing system 10 ignores the invalid data and pre-learns a conversion model for performing viewpoint conversion from valid input data (for example, a student image).

Specifically, the information processing system 10 randomly selects the captured images P from the captured images P_1 to P_8 at the time of pre-learning. The information processing system 10 changes the selected captured image P to invalid data and learns viewpoint conversion.

The information processing system 10 can determine the number of captured images P to be randomly selected by using probabilistic means. The information processing system 10 can determine the number between "0" and "7" in accordance with a normal distribution as the number of captured images P to be selected.

In order for the information processing apparatus to efficiently perform additional learning with a relatively small number of samples, the information processing apparatus 100 desirably has in advance performance to generate the converted image P_V even in a case where a black signal in which the conversion model is invalid is input. The information processing system 10 performs pre-learning on the assumption in advance that invalid data is input at the time of additional learning. As a result, the information processing system 10 can obtain a prediction model having this performance in advance before the additional learning.

The information processing system 10 can perform highly accurate non-personalized viewpoint conversion while utilizing a correlation between all the viewpoints of the imaging devices 300_1 to 300_8 by pre-learning the conversion model.

In this manner, in the pre-learning of the conversion model, the correlation between all the viewpoints is utilized. Therefore, in general, as the number of viewpoints increases, that is, as the number of imaging devices 300 increases, the information processing system 10 can perform pre-learning with higher accuracy. Furthermore, as described above, the information processing system 10 can learn in advance a prediction model that receives invalid data as part of input data.

When performing personalized learning, the information processing system 10 executes personalized learning by using a coefficient of a conversion model obtained by pre-learning as an initial coefficient. For example, if the prediction model is implemented by DNN, the information processing system 10 performs learning by additionally performing error back propagation to minutely change the coefficient.

As described above, the information processing system 10 performs personalized learning by using the symmetry of the arrangement of the imaging devices 300. Therefore, the information processing system 10 can input invalid data to the prediction model as a large number of input images (see FIG. 8).

In the example in FIG. 8, the information processing system 10 inputs the student image P_S (captured image P_1) as the captured image P_2 to the prediction model, but inputs invalid data such as a black signal, for example, as the other captured images P_1 and P_3 to P_8.

In this case, the information processing system 10 performs personalized learning of minutely changing the coefficient of the conversion model so as to perform viewpoint conversion utilizing the captured image P_1 instead of the correlation between all the viewpoints of the captured images P_1 to P8.

For example, the information processing system 10 sets the captured images P_2 and P_4 as the student image P_S and sets the captured image P_1 as the teacher image P_T. In this case, the information processing system 10 inputs the student image P_S (captured images P_2 and P_4) as the captured images P_5 and P_7, and inputs invalid data such as a black signal as the captured images P_1 to P_4, P_6, and P_8.

In this case, the information processing system 10 performs personalized learning of minutely changing the coefficient of the conversion model so as to perform viewpoint conversion utilizing the correlation between the viewpoints of the captured images P_5 and P_7 instead of the correlation between all the viewpoints of the captured images P_1 to P8.

In this manner, it is assumed that the information processing system 10 learns the viewpoint conversion specialized for an individual online. In this case, the information processing system 10 does not use the correlation between all the viewpoints of the imaging devices 300_1 to 300_8, but uses a viewpoint correlation of the specific imaging device 300 (input imaging device C_I) to perform learning.

As described above, the online personalized learning is performed by using the coefficient of the prediction model pre-learned as an initial coefficient. Therefore, even if the information processing system 10 performs learning by using the viewpoint correlation of the specific imaging device 300, the prediction model does not always forget all the viewpoint conversion utilizing the correlation between all the viewpoints acquired by pre-learning.

Furthermore, the information processing system 10 can perform personalized learning by adding ingenuity such that the prediction model does not forget viewpoint conversion utilizing the correlation between all the viewpoints. For example, even when performing personalized learning, the information processing system 10 can occasionally insert learning that utilizes the correlation between all the viewpoints equivalent to pre-learning.

In this manner, the information processing system 10 can improve the performance of the prediction model by personalized learning while maintaining learning using the correlation between all the viewpoints.

In actual operation, the information processing system 10 inputs all the captured images P_1 to P8 to the conversion model. Ideally, the conversion model that has performed personalized learning can exhibit personalized performance while using all the captured images P_1 to P8.

As described above, in general, as the number of viewpoints is larger, the conversion model has a property of being able to perform more accurate viewpoint conversion. This property can be passed on to the prediction model after personalized learning. Therefore, in the prediction model, there is a possibility that the viewpoint conversion can be performed with higher image quality as the number of imaging devices 300 included in the information processing system 10 is larger. As a result, the information processing system 10 may include more imaging devices 300.

2. CONFIGURATION EXAMPLE OF INFORMATION PROCESSING SYSTEM

Figure 12:
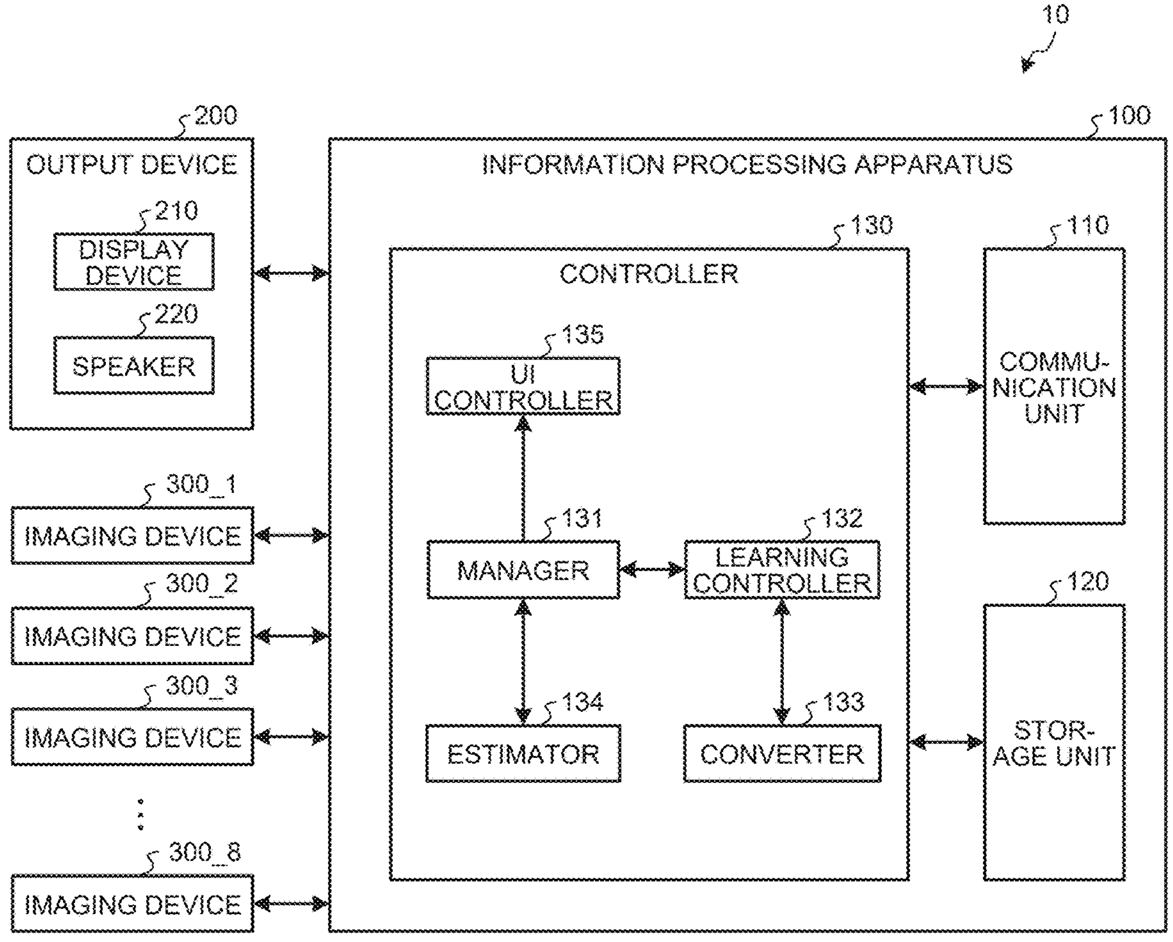
FIG. 12 is a block diagram illustrating a configuration example of the information processing system according to an embodiment of the present disclosure.

FIG. 12 is a block diagram illustrating a configuration example of the information processing system 10 according to an embodiment of the present disclosure. The information processing system 10 illustrated in FIG. 12 includes the information processing apparatus 100, an output device 200, and the plurality of imaging devices 300_1 to 300_8.

[Output Device 200]

The output device 200 is a device that visually or audibly notifies the user U of information, for example, presents guidance information to the user U who uses the information processing system 10. The output device 200 includes the display 210 and a speaker 220.

(Display 210)

The display 210 is, for example, a display device such as a liquid crystal display (LCD) or an organic electro luminescence (EL) display. The display 210 displays various types of information such as guidance information and a telecommunication partner.

(Speaker 220)

The speaker 220 is a sound output device that notifies the user U of sound information. The speaker 220 outputs sound information such as guidance information and the voice of the telecommunication partner.

Note that the output device 200 can include a device other than the display 210 and the speaker 220. The output device 200 can include, for example, a lighting device such as a light emitting diode (LED) lamp or a sound output device such as a buzzer.

For example, the output device 200 may guide the user U to the teacher imaging device C_T by turning on an LED lamp disposed near the imaging device 300 selected as the teacher imaging device C_T.

[Imaging Device 300]

The imaging device 300 is, for example, a camera having an imaging element such as a charge coupled device (CCD) image sensor or a complementary metal oxide semiconductor (CMOS) image sensor. The imaging device 300 is disposed around the display 210, for example (see FIG. 4). The imaging device 300 generates the captured image P.

Note that it is assumed that calibration related to the relative position between the display 210 and each imaging device 300 is performed for the plurality of imaging devices 300_1 to 300_8.

Furthermore, the information processing system 10 can include sensors other than the imaging device 300, for example, various sensors such as a microphone and a distance measuring sensor. The information processing system 10 can include an input device such as a keyboard, a mouse, or a touch panel.

[Information Processing Apparatus 100]

The information processing apparatus 100 illustrated in FIG. 12 includes a communication unit 110, a storage unit 120, and a controller 130. The information processing apparatus 100 controls the output device 200 to notify the user U of various types of information. The information processing apparatus 100 controls the imaging device 300 to acquire the captured image P.

(Communication Unit 110)

The communication unit 110 is a communication interface that communicates with an external device (for example, another information processing apparatus 100) via a network in a wired or wireless manner. The communication unit 110 illustrated in FIG. 12 is implemented by, for example, a network interface card (NIC) or the like. The communication unit 110 functions as communication means of the information processing apparatus 100.

(Storage Unit 120)

The storage unit 120 is a storage device capable of reading and writing data, such as a DRAM, an SRAM, a flash memory, or a hard disk. The storage unit 120 functions as storage means of the information processing apparatus 100.

(Controller 130)

The controller 130 controls each unit of the information processing apparatus 100. The controller 130 is implemented, for example, by executing a program stored inside the information processing apparatus 100 by a central processing unit (CPU), a micro processing unit (MPU), a graphics processing unit (GPU), or the like using a random access memory (RAM) or the like as a work area. The controller 130 is implemented by an integrated circuit such as an application specific integrated circuit (ASIC) or a field programmable gate array (FPGA).

The controller 130 includes a manager 131, a learning controller 132, a converter 133, an estimator 134, and a UI controller 135. Each block (from the manager 131 to the UI controller 135) constituting the controller 130 is a functional block indicating a function of the controller 130. These functional blocks may be software blocks or hardware blocks. For example, each of the functional blocks described above may be one software module implemented by software (including a microprogram), or may be one circuit block on a semiconductor chip (die). Alternatively, each functional block may be one processor or one integrated circuit. The controller 130 may be configured by a functional unit different from the functional block described above. A method of configuring the functional block is arbitrary.

Note that the controller 130 may be configured by a functional unit different from the functional block described above. In addition, some or all of the motions of the blocks (from the manager 131 to the UI controller 135) constituting the controller 130 may be performed by another device. For example, some or all of the motions of the blocks constituting the controller 130 may be performed by a control device implemented by cloud computing.

(Manager 131)

The manager 131 manages acquisition of learning data used for personalized learning performed by the learning controller 132. The manager 131 acquires learning data, for example, in response to a request from the learning controller 132. The manager 131 generates a plan for acquiring learning data. The manager 131 guides the user U in accordance with the plan and generates learning data. The manager 131 notifies the learning controller 132 of the learning data.

(Learning Controller 132)

The learning controller 132 generates a personalized learning plan and executes the plan by using the learning data acquired by the manager 131. The learning controller 132 verifies a result of personalized learning. The learning controller 132 verifies whether the conversion model after learning satisfies desired accuracy of viewpoint conversion.

(Converter 133)

The converter 133 generates the converted image P_V from the captured image P by using the conversion model. The converter 133 generates the converted image P_V obtained by converting the viewpoint of the captured image P into the viewpoint from the virtual camera C_V. The converter 133 converts the viewpoint of the captured image P into the viewpoint from the virtual camera C_V by using the conversion model learned by the learning controller 132.

(Estimator 134)

The estimator 134 estimates a face state of the user U by using the captured image P. The estimator 134 estimates, for example, the position and expression of the face and the orientation of the head (head pose) as the face state of the user U. For example, the estimator 134 estimates the face state of the user U in response to an instruction from the manager 131, and notifies the manager 131 of the estimated face state as face information.

(UI Controller 135)

The UI controller 135 generates display information in response to an instruction from the manager 131. The display information is output from the output device 200, for example. The display information includes, for example, guidance information for guiding the user U.

[Details of Manager 131]

The manager 131 makes a plan about a method of acquiring learning data to be used when personalized learning is performed. This plan includes information related to a combination of the imaging devices 300 used for personalized learning. The manager 131 selects a combination of the imaging devices 300 to be used for personalized learning in consideration of symmetry of arrangement of the imaging devices 300 on the basis of position information of the imaging devices 300.

The manager 131 acquires learning data in accordance with the created plan. The manager 131 selects the teacher imaging device C_T on the basis of the plan. The manager 131 guides the user U to confront the selected teacher imaging device C_T. For example, the manager 131 determines a guidance target of the user U in accordance with the face state of the user U estimated by the estimator 134 and the teacher imaging device C_T. The manager 131 instructs the UI controller 135 to create a UI for guiding the user U in accordance with the determined guidance target.

The manager 131 determines whether the user U has moved to the guidance target on the basis of the face state of the user U estimated by the estimator 134. The manager 131 acquires learning data when the user U has moved to the guidance target. The manager 131 outputs the acquired learning data to the learning controller 132. When receiving an acquisition request of the learning data from the learning controller 132, the manager 131 updates the plan about the method of acquiring the learning data and newly acquires learning data.

Figure 13:
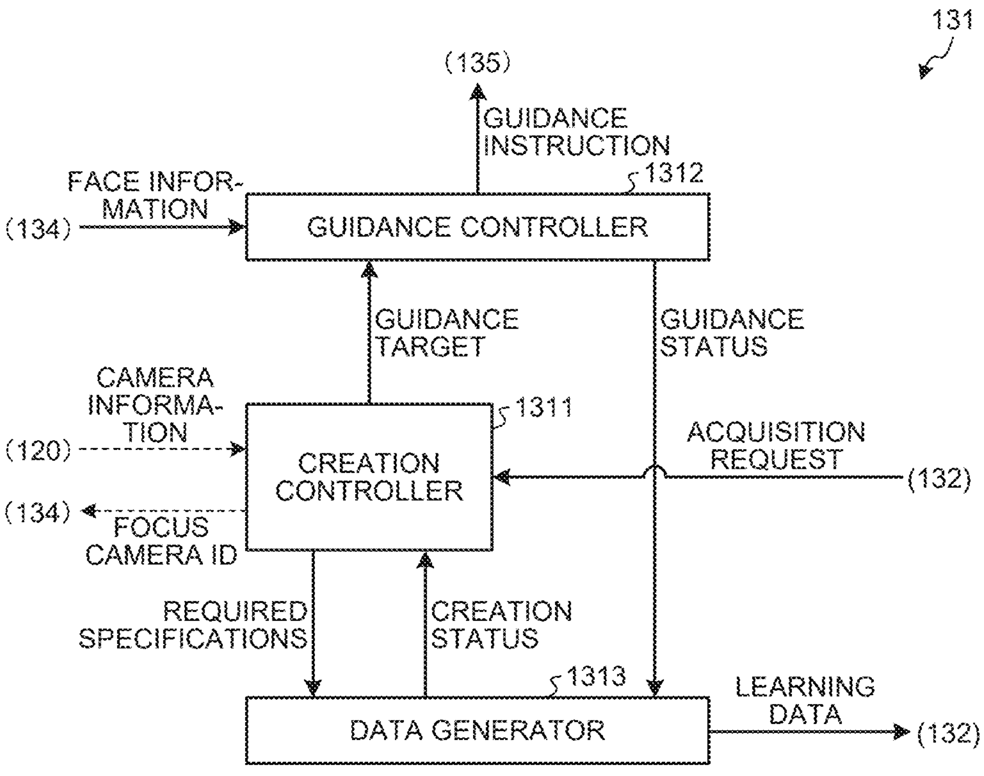
FIG. 13 is a block diagram illustrating a configuration example of a manager according to an embodiment of the present disclosure.

FIG. 13 is a block diagram illustrating a configuration example of the manager 131 according to an embodiment of the present disclosure. As illustrated in FIG. 13, the manager 131 includes a creation controller 1311, a guidance controller 1312, and a data generator 1313.

(Creation Controller 1311)

The creation controller 1311 creates a learning data acquisition plan. The creation controller 1311 acquires information regarding the arrangement and position of the imaging device 300 (hereinafter described as camera information) from the storage unit 120, for example.

Note that the camera information is, for example, information indicating the position of the imaging device 300 on the display 210, the relative positional relationship of the imaging device 300, and the like, and is stored in the storage unit 120 in advance. Alternatively, the creation controller 1311 may acquire the camera information from, for example, the imaging device 300 or an external device.

The creation controller 1311 creates the learning data acquisition plan by selecting at least one combination (hereinafter also simply referred to as a combination) of the imaging devices 300 to be used for personalized learning in consideration of the camera information.

The creation controller 1311 selects an imaging scene and a length of learning data to be acquired for each selected combination. The creation controller 1311 selects a head pose or an expression of the user U as the imaging scene. The creation controller 1311 selects, for example, the number of captured images P to be acquired (the number of frames) as the length. The creation controller 1311 selects the order of the learning data to be acquired.

FIG. 14 is a diagram illustrating an example of the learning data acquisition plan according to an embodiment of the present disclosure. FIG. 14 illustrates the learning data acquisition plan sequentially executed from a start to an end. The creation controller 1311 selects a plurality of combinations in the order of use of the learning data from among 28 combinations illustrated in FIGS. 9 and 10.

In the example in FIG. 14, the creation controller 1311 first selects the combination with the combination number #13 and then selects the combination with the combination number #16.

For example, the creation controller 1311 selects, as the combination with the combination number #13, a combination with the imaging devices 300_2 and 300_4 as the student imaging device C_S, the imaging devices 300_5 and 300_7 as the input imaging device C_I, and the imaging device 300_1 as the teacher imaging device C_T.

For example, the creation controller 1311 selects, as the combination with the combination number #16, a combination with the imaging devices 300_5 and 300_7 as the student imaging device C_S, the imaging devices 300_2 and 300_4 as the input imaging device C_I, and the imaging device 300_8 as the teacher imaging device C_T.

The creation controller 1311 selects at least one head pose for each combination. FIG. 15 is a table illustrating an example of the head pose according to an embodiment of the present disclosure.

As illustrated in FIG. 15, the head pose includes a plurality of poses in which the orientation of the head of the user U is different. In the example in FIG. 15, the head pose includes five head poses of pose 1 to pose 5.

For example, the pose 1 is a head pose in which the user U faces forward. The pose 2 is a head pose in which the user U obliquely faces the right in the drawing. The pose 3 is a head pose in which the user U obliquely faces the left in the drawing. The pose 4 is a head pose in which the user U tilts the head to the right side in the drawing. The pose 5 is a head pose in which the user U tilts the head to the left side in the drawing.

Note that, although a case where there are five head poses has been described here, the number of head poses may be four or less or six or more. A pose other than the pose 1 to 5 illustrated in FIG. 15, such as a pose in which the user U faces backward, may be included in the head poses.

The creation controller 1311 selects at least one pose from among a plurality of head poses and generates the learning data acquisition plan.

In the example in FIG. 14, the creation controller 1311 sequentially selects the poses 1, 2, and 3 as the head poses to be executed when selecting the combination with the combination number #13. The creation controller 1311 sequentially selects the poses 4, 5, and 1 as the head poses to be executed when selecting the combination with the combination number #16.

Here, the creation controller 1311 selects three head poses for one combination, but the number of head poses selected by the creation controller 1311 is not limited to three. The creation controller 1311 may select two or less head poses or four or more head poses for one combination.

The creation controller 1311 selects at least one expression for each head pose. FIG. 16 is a table illustrating an example of the expression according to an embodiment of the present disclosure.

As illustrated in FIG. 16, the expression includes a plurality of expressions 1, 2, 3, . . . . For example, the expression 1 is an expression indicating "joy". When the expression 1 is selected, the information processing apparatus 100 guides the user U to make an expression of joy. The expression 5 is "expressionless". The expression 6 is an expression when a designated sentence 1 is uttered. As described above, the expression can include an expression when a specific motion (for example, utterance) is made in addition to an expression expressing an emotion.

Although a case where there are seven or more facial expressions has been described here, the number of facial expressions may be six or less.

The creation controller 1311 selects at least one expression from among a plurality of expressions and generates the learning data acquisition plan.

In the example in FIG. 14, in a case where the pose 1 is selected as the head pose when the combination with the combination number #13 is selected, the creation controller 1311 sequentially selects the expressions 1 and 2 as the expressions. In a case where the pose 4 is selected as the head pose when the combination with the combination number #16 is selected, the creation controller 1311 sequentially selects the expressions 3, 4, and 2 as the expressions.

In FIG. 14, the creation controller 1311 selects two to four expressions for one head pose, but the number of expressions selected by the creation controller 1311 is not limited to two to four. The creation controller 1311 may select one expression or may select five or more expressions for one head pose.

The creation controller 1311 selects a length (the number of frames) for acquiring the captured image P for each expression. When selecting the combination with the combination number #13, the head pose of the pose 1, and the expression 1, the creation controller 1311 determines to acquire the captured image P of 60 frames. When selecting the combination with the combination number #13, the head pose of the pose 2, and the expression 4, the creation controller 1311 determines to acquire the captured image P of 40 frames.

In this manner, the creation controller 1311 generates the learning data acquisition plan by selecting a combination of the imaging devices 300, a head pose, an expression, an imaging time, and the like. The learning data acquisition plan illustrated in FIG. 14 is an example, and the creation controller 1311 can create various plans by using an existing method. It is sufficient that the information processing apparatus 100 can acquire the learning data by using the symmetry of the arrangement of the imaging device 300, and an arbitrary item and an arbitrary plan can be adopted as the learning data acquisition plan.

The creation controller 1311 can create the learning data acquisition plan on the basis of some guidelines, for example. For example, the creation controller 1311 creates the learning data acquisition plan so that a sufficient amount of personalized learning can be performed by using as many imaging devices 300 as possible. The creation controller 1311 aims to maximize the performance of the viewpoint conversion by acquiring a large amount of learning data.

Alternatively, the creation controller 1311 may create the learning data acquisition plan so as to minimize the acquisition of the learning data. In this case, the creation controller 1311 can further improve the performance of the viewpoint conversion while suppressing a load on the user U.

The creation controller 1311 receives the acquisition request for learning data from the learning controller 132. In the acquisition request, the type of learning data desired to be acquired, for example, a combination of the imaging devices 300, a head pose, an expression, or the like can be designated.

When receiving the acquisition request, the creation controller 1311 creates a learning data acquisition plan corresponding to the acquisition request. Alternatively, the creation controller 1311 updates the already created learning data acquisition plan in response to the acquisition request.

Next, the creation controller 1311 executes the created learning data acquisition plan. The creation controller 1311 selects a plan to be executed in order from the start.

In the example in FIG. 14, the creation controller 1311 first determines to acquire the captured image P of 60 frames for the combination with the combination number #13, the head pose of the pose 1, and the expression 1. Hereinafter, a plan to acquire the captured image P of 60 frames for the combination with the combination number #13, the head pose of the pose 1, and the expression 1 will be also referred to as a first scene of the learning data acquisition plan.

In this case, the creation controller 1311 sets the imaging devices 300_2 and 300_4 as the student imaging device C_S, the imaging devices 300_5 and 300_7 as the input imaging device C_I, and the imaging device 300_1 as the teacher imaging device C_T.

The creation controller 1311 sets the guidance target to "the user U confronts the imaging device 300_1 and makes the expression of the expression 1 in the head pose of the pose 1". The creation controller 1311 notifies the guidance controller 1312 of the set guidance target. Note that the creation controller 1311 may notify the guidance controller 1312 of camera information in addition to the guidance target.

The creation controller 1311 notifies the data generator 1313 of required specifications. The required specifications include information related to the combination of the imaging devices 300 when the learning data is acquired in the first scene and the length of the first scene (60 frames in the example in FIG. 14). The required specifications can include information such as a head pose and an expression. These information can be used by the learning controller 132.

As illustrated in FIG. 13, the creation controller 1311 notifies the estimator 134 of a focus camera ID. A focus camera is the imaging device 300 that the information processing apparatus 100 guides the user U to confront the user U. In the case of the first scene, the information processing apparatus 100 guides the user U to confront the imaging device 300_1. In this case, the focus camera is the imaging device 300_1.

The creation controller 1311 notifies the estimator 134 of information indicating the imaging device 300_1 as the focus camera ID.

As described above, the estimator 134 estimates the face state of the user U. When the information processing apparatus 100 guides the user U to confront the imaging device 300_1 and executes the first scene, the information processing apparatus 100 acquires learning data after confirming that the user U has moved to the front of the imaging device 300_1 and is making a desired head pose or expression.

It is therefore sufficient for the estimator 134 to estimate the face state of the user U from the captured image P_1 of the imaging device 300_1. Since the creation controller 1311 notifies the estimator 134 of the focus camera ID, the estimator 134 can recognize which imaging device 300 should be used to estimate the face state. As a result, the information processing apparatus 100 can further reduce a processing load of estimation of the face state by the estimator 134.

(Guidance Controller 1312)

The guidance controller 1312 in FIG. 13 receives the guidance target from the creation controller 1311 and receives information related to the face state from the estimator 134. The guidance controller 1312 generates a guidance instruction on the basis of the guidance target and the face state. The guidance controller 1312 notifies the UI controller 135 of the guidance instruction.

The guidance controller 1312 generates a guidance instruction such that the face state of the user U approaches the guidance target. Note that the information related to the face state of the user U (hereinafter also referred to as face information) is information indicating the face state of the user U at the current time.

The face information can be defined as information sufficient for the guidance controller 1312 to determine whether each item of the learning data acquisition plan is satisfied. For example, in the learning data acquisition plan in FIG. 14, the face information includes information related to a face position of the user U, information related to an estimation result of the head pose, and information related to an estimation result of the expression.

Note that the information included in the face information is not limited to the above examples. The information included in the face information can be appropriately set in accordance with the item of the learning data acquisition plan.

(Face Position Information)

The information related to the face position of the user U (hereinafter also referred to as face position information) is used to guide the user U to a desired position of the imaging device 300. The guidance controller 1312 compares the desired position of the imaging device 300 with the current face position of the user U to generate a guidance instruction for guiding the user U to confront the desired imaging device 300.

The guidance instruction includes information related to a guidance destination. For example, it is assumed that the UI controller 135 guides the user U by displaying a square frame at a position to which the face of the user U is desirably guided. At this time, the guidance controller 1312 can include information related to the position and size of the square frame in the guidance instruction.

Furthermore, the guidance controller 1312 can include the current face position information of the user U in the guidance instruction. As a result, the UI controller 135 can display, as the UI, visual representation for guiding from the current face position of the user U to the position of the guidance destination (the square frame described above).

The guidance instruction is not limited to the information related to the guidance destination described above. The guidance instruction may be information related to a direction and a movement amount for guiding the user U. The guidance instruction can further include the focus camera ID.

Note that the guidance controller 1312 acquires, for example, the position information (camera information) of the imaging device 300 from the creation controller 1311. Alternatively, the guidance controller 1312 may acquire the camera information from the storage unit 120. Note that a coordinate system of the position information of the imaging device 300 and a coordinate system of the face position information are unified. Alternatively, when comparing the position of the imaging device 300 with the face position of the user U, the guidance controller 1312 projects both positions to the same coordinate system and performs the comparison.

(Head Pose Information)

The information related to the estimation result of the head pose of the user U (hereinafter also referred to as head pose information) is used to guide the user U to take a desired head pose.

The guidance controller 1312 compares the desired head pose with the current head pose information to generate a guidance instruction for guiding the user U to take the desired head pose. When the user U does not take a desired head pose, the guidance controller 1312 notifies the UI controller 135 of information designating the desired head pose as the guidance instruction. When the user U is taking a desired head pose, the guidance controller 1312 can notify the UI controller 135 of the fact.

(Expression Information)

The information related to the estimation result of the expression of the user U (hereinafter also referred to expression information) is used to guide the user U to make a desired expression.

The guidance controller 1312 compares the desired expression with the current expression information to generate a guidance instruction for guiding the user U to make the desired expression. When the user U does not have the desired expression, the guidance controller 1312 notifies the UI controller 135 of information designating the desired expression as a guidance instruction. When the user U has the desired expression, the guidance controller 1312 can notify the UI controller 135 of the fact.

Note that the guidance controller 1312 can collectively guide the user U by collectively presenting all the items to be guided to the user U. Alternatively, the guidance controller 1312 may sequentially guide the user U by sequentially presenting a plurality of items to be guided to the user U one by one. For example, the guidance controller 1312 may first guide the position of the user U, then guide the head pose, and finally guide the expression.

There is a degree of freedom in a guidance manner of the user U by the guidance controller 1312. The guidance controller 1312 can create a guidance manner of the user U as a sub-plan of the learning data acquisition plan. Alternatively, the creation controller 1311 may create a sub-plan, include the sub-plan in the guidance target, and notify the guidance controller 1312 of the sub-plan.

(Guidance Status)

The guidance controller 1312 notifies the creation controller 1311 of the current situation of the user U as a guidance status. The guidance controller 1312 generates a guidance status including the face position information, head pose information, and expression information on the basis of the information related to a face status acquired from the estimator 134. The guidance controller 1312 notifies the data generator 1313 of the guidance status. The guidance controller 1312 may notify the UI controller 135 of the guidance status. The UI controller 135 can generate a UI to be presented to the user U by using the guidance status.

(Data Generator)

The data generator 1313 acquires the required specifications from the creation controller 1311. As described above, the required specifications includes information related to the combination of the imaging devices 300 at the time of acquiring the learning data and a period (length, for example, the number of frames) for acquiring the learning data.

The data generator 1313 acquires the captured image P of the imaging device 300. The data generator 1313 acquires the captured image P in association with which imaging device 300 has captured which captured image P.

The data generator 1313 acquires the guidance status from the guidance controller 1312. When the state of the user U satisfies the guidance target, the data generator 1313 generates learning data that satisfies the required specifications from the acquired captured image P.

For example, when the first scene of the learning data acquisition plan is executed, the data generator 1313 sets the captured images P_2 and P_4 as the student image P_S and the captured image P_1 as the teacher image P_T among the acquired captured images P, and acquires 60 frames of each captured image P.

The data generator 1313 outputs each acquired captured image P to the learning controller 132 as learning data in the first scene. The data generator 1313 can include information that can be used for personalized learning, such as image type information indicating whether the acquired captured image P is the student image P_S or the teacher image P_T or camera ID information for identifying the imaging device 300, in the learning data and notify the learning controller 132 of the learning data. Note that the data format of the learning data is arbitrary, and an existing data format can be adopted.

The data generator 1313 can notify the learning controller 132 of the information related to the combination of the imaging devices 300 and the information related to the head pose and the expression in association with the learning data. These information can be used for personalized learning performed by the learning controller 132.

Note that the plurality of imaging devices 300_1 to 300_8 is calibrated in advance and an imaging timing and the like are synchronized.

When the generation of the learning data having the length requested by the acquisition request is completed, the data generator 1313 notifies the creation controller 1311 of the completion as a data creation status.

When the data acquisition fails while the data generator 1313 is acquiring the learning data, the data acquisition is performed again after the learning data created so far is discarded once.

For example, it is assumed that the state of the user U deviates from the guidance target due to the movement of the user U during the acquisition of the learning data. In this case, the guidance status changes from a state of satisfying the guidance target to a state of not satisfying the guidance target. In this case, the data generator 1313 discards the created learning data and acquires the learning data again after waiting until the state of the user U satisfies the guidance target.

Note that whether the guidance status satisfies the guidance target may be determined by the data generator 1313 or may be determined by the guidance controller 1312. When the guidance controller 1312 determines whether the state of the user U satisfies the guidance target, the guidance controller 1312 may notify the data generator 1313 of a determination result as the guidance status.

As described above, when the generation of the learning data in one scene of the learning data acquisition plan is completed, the data generator 1313 notifies the completion to the creation controller 1311 as the data creation status.

Upon receiving the data creation status, the creation controller 1311 advances the learning data acquisition plan to the next scene, instructs the guidance controller 1312 to guide the user U, and instructs the data generator 1313 to generate learning data.

For example, it is assumed that the manager 131 has completed a plan to acquire the captured image P of 60 frames for the combination with the combination number #13, the head pose of the pose 1, and the expression 1 as the first scene. In this case, the creation controller 1311 executes a plan to acquire the captured image P of 60 frames for the combination with the combination number #13 as the second scene, the head pose of the pose 1, and the expression 2.

The creation controller 1311 sequentially executes each scene until all the scenes of the learning data acquisition plan are completed. When the last scene is executed, the creation controller 1311 can include the execution in the required specifications and notify the data generator 1313 of the execution. Upon receiving the required specification indicating that the scene is the last scene, the data generator 1313 can output information indicating that the generated learning data is the last data of the plan to the learning controller 132 in association with the learning data.

[Details of Learning Controller 132]

The learning controller 132 has a function of acquiring learning data from the manager 131 and managing the learning data. The learning controller 132 has a function of planning and executing personalized learning and updating coefficient data. The learning controller 132 has a function of notifying the manager 131 of an acquisition request for requesting acquisition of additional learning data when the personalized learning is insufficient.

Figure 17:
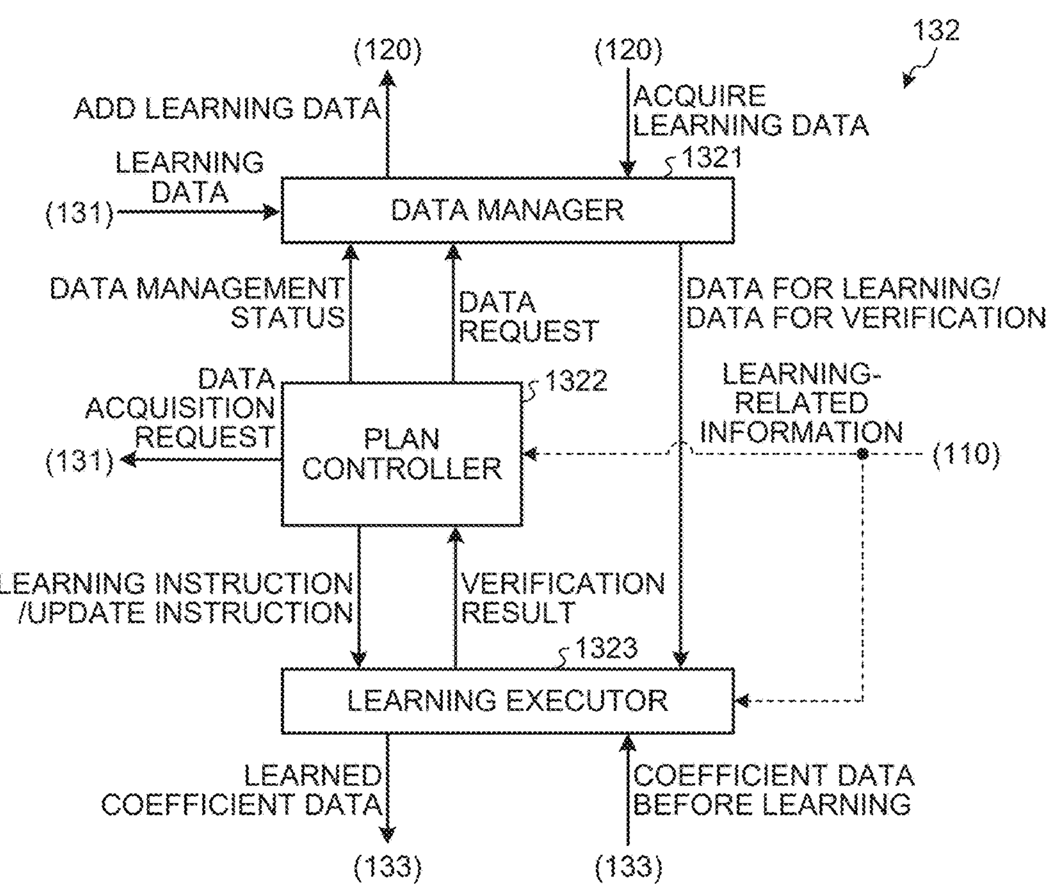
FIG. 17 is a block diagram illustrating a configuration example of a learning controller according to an embodiment of the present disclosure.

FIG. 17 is a block diagram illustrating a configuration example of the learning controller 132 according to an embodiment of the present disclosure. As illustrated in FIG. 17, the learning controller 132 includes a data manager 1321, a plan controller 1322, and a learning executor 1323.

(Data Manager 1321)

The data manager 1321 acquires the learning data from the manager 131 and manages the learning data. When acquiring the learning data, the data manager 1321 adds the acquired learning data to the storage unit 120. Alternatively, the data manager 1321 may add the learning data to a database (not illustrated) that holds the learning data.

The data manager 1321 manages the captured image P included in the learning data in association with attribute information such as the camera ID information, the combination, the head pose, the expression, and the number of acquired frames.

When the learning data stored in the storage unit 120 is updated, the data manager 1321 notifies the plan controller 1322 of a data management status. The data management status includes, for example, a list file of learning data managed by the data manager 1321.

When the learning data acquired from the manager 131 is learning data generated last in the learning data acquisition plan, the data manager 1321 notifies the plan controller 1322 of the data management status including information indicating that the learning data is the last learning data (hereinafter also referred to as an acquisition completion notification).

When receiving a notification of a data request for requesting learning data from the plan controller 1322, the data manager 1321 acquires the learning data stored in the storage unit 120 in response to the data request.

For example, by using a part of the acquired learning data as data for learning to be used for learning and using the rest of the acquired learning data as data for verification to be used for verification, the data manager 1321 can generate the data for learning and the data for verification. The data manager 1321 generates, for example, the data for learning and the data for verification in a predetermined format.

The data manager 1321 outputs the data for learning and the data for verification to the learning executor 1323.

(Plan Controller 1322)

The plan controller 1322 plans personalized learning and controls the personalized learning. Specifically, the plan controller 1322 refers to the data management status acquired from the data manager 1321 and a verification result acquired from the learning executor 1323, and notifies the data manager 1321 of the acquisition request for the data for learning. The plan controller 1322 notifies the learning executor 1323 to execute at least one of a learning instruction for instructing personalized learning using the acquired data for learning or an update instruction for instructing update of coefficient data obtained as a result of learning.

The plan controller 1322 refers to the data management status acquired from the data manager 1321 and the verification result acquired from the learning executor 1323, and notifies the manager 131 of the acquisition request for additional learning data.

(First Learning Plan)

For example, when a total amount of learning data to be generated by the manager 131 is determined in advance, the plan controller 1322 executes a first learning plan. Note that the information that the total amount of learning data to be generated is determined in advance is shared by both the manager 131 and the learning controller 132.

For example, the plan controller 1322 notifies the data manager 1321 of the data request at a time point when the data manager 1321 acquires all the learning data while referring to the data management status. At this time, for example, the plan controller 1322 requests all the learning data acquired by the data manager 1321 by distributing the data for learning and the data for verification.

The plan controller 1322 notifies the learning executor 1323 of a learning instruction including the data for learning and a verification instruction including the data for verification. The plan controller 1322 may simultaneously notify the learning executor 1323 of the learning instruction and the verification instruction. The plan controller 1322 may notify the learning executor 1323 of the learning instruction, and may notify the learning executor 1323 of the verification instruction after completion of personalized learning by the learning executor 1323.

The plan controller 1322 notifies the learning executor 1323 of a learning instruction with a parameter (for example, a hyperparameter) for appropriate personalized learning. The parameter varies depending on a machine learning scheme. Examples of the parameter in a case where the machine learning is DNN include a learning rate and a weight of a loss function.

The plan controller 1322 can acquire information (hereinafter also referred to as learning-related information) used for personalized learning from an external device (not illustrated) via the communication unit 110, for example. The learning-related information includes parameters for the personalized learning described above, information related to a network configuration of the conversion model, and the like. When the storage unit 120 stores at least a part of the learning-related information in advance, the plan controller 1322 can acquire at least a part of the learning-related information from the storage unit 120.

(Second Learning Plan)

For example, when the total amount of learning data to be generated by the manager 131 is not determined in advance, the plan controller 1322 executes a second learning plan. In this case, the plan controller 1322 confirms that the manager 131 has acquired all the learning data by the acquisition completion notification included in the data management status.

Note that the plan controller 1322 can generate the second learning plan similarly to the first learning plan except that the total amount of learning data is not determined in advance. In the second learning plan, the same content as the content of the first learning plan will not be described.

In the second learning plan, the manager 131 can acquire learning data of an arbitrary size. Therefore, for example, the manager 131 can update the learning data acquisition plan in response to the acquisition request for the learning data notified from the plan controller 1322 and acquire the learning data. The plan controller 1322 notifies the manager 131 of the acquisition request for learning data with reference to the verification result by the learning executor 1323.

As a result, the information processing apparatus 100 can efficiently perform personalized learning while flexibly changing the learning data acquisition plan by executing the second learning plan.

In this case, the plan controller 1322 desirably instructs the learning executor 1323 with the learning instruction before the data manager 1321 transmits the acquisition completion notification indicating that all the learning data has been acquired. That is, the learning controller 132 sequentially performs personalized learning at a time point when learning data is acquired to some extent without waiting for completion of acquisition of the learning data.

As a result, the learning controller 132 can notify the manager 131 of the learning data acquisition request on the basis of the verification result of the personalized learning, and the manager 131 can flexibly update the learning data acquisition plan in response to the acquisition request.

In the second learning plan, at a time point when the data manager 1321 acquires a predetermined amount of learning data, the plan controller 1322 requests acquisition by distributing the learning data into data for learning and data for verification. In the second learning plan, as in the first learning plan, the plan controller 1322 can request the data for learning and the data for verification at a time point when the data manager 1321 notifies the plan controller 1322 of the acquisition completion notification.

After requesting the data for learning and the data for verification, the plan controller 1322 notifies the learning executor 1323 of the learning instruction and the verification instruction.

In both the first learning plan and the second learning plan, the plan controller 1322 acquires, from the learning executor 1323, a result of an evaluation of the performance after the execution of learning as a verification result.

When the verification result does not reach a target, the plan controller 1322 specifies learning data to be additionally acquired, that is, to be reinforced, and notifies the manager 131 of an acquisition request of the learning data.

When the verification result is sufficient, the plan controller 1322 instructs the learning executor 1323 to notify the converter 133 of the learned coefficient data.

When the verification result does not reach the target even after repeated learning, the plan controller 1322 ends the personalized learning. For example, when the verification result does not reach the target even if the acquisition request for the learning data is made a predetermined number of times, the plan controller 1322 does not make any further acquisition request.

In this case, the plan controller 1322 instructs the learning executor 1323 to notify the converter 133 of the coefficient data of learning having the best performance among the personalized learning executed so far as the learned coefficient data.

Therefore, the plan controller 1322 manages the coefficient data and the verification result in association with each other. The plan controller 1322 compares a plurality of verification results and notifies the converter 133 of coefficient data associated with the verification result having the highest performance as the learned coefficient data.

Note that the learning executor 1323 may manage the coefficient data and the verification result. In this case, the plan controller 1322 notifies the learning executor 1323 of information indicating a verification result with the highest performance (for example, a verification ID assigned to the verification result or the like). The learning executor 1323 outputs coefficient data associated with the verification result designated by the verification ID to the converter 133.

The plan controller 1322 can notify the manager 131 that further acquisition of learning data is not requested as the acquisition request. For example, when the verification result reaches the target, the plan controller 1322 notifies the manager 131 that further acquisition of learning data is not necessary.

Upon receipt of the notification that further acquisition of learning data is not necessary from the plan controller 1322 while acquiring the learning data, the manager 131 ends the acquisition of the learning data. As a result, the manager 131 can end the acquisition of the learning data even while executing the learning data acquisition plan.

Note that the learning plan created by the plan controller 1322 is not limited to the first learning plan and the second learning plan described above. The plan controller 1322 can create various learning plans.

(Learning Executor 1323)

The learning executor 1323 executes personalized learning. The learning executor 1323 verifies a learning result and updates the coefficient data.

(Learning)

When acquiring the learning instruction from the plan controller 1322, the learning executor 1323 executes the personalized learning by using the data for learning. The learning executor 1323 acquires the coefficient data before personalized learning from the converter 133. The coefficient data before personalized learning is coefficient data of a conversion model learned in advance to correspond to an unspecified user U.

The learning executor 1323 uses the data for learning to execute personalized learning in accordance with a parameter for personalized learning, and updates the coefficient data. For example, the learning executor 1323 is notified of the parameter for the personalized learning in addition to the learning instruction.

Description will be made of, for example, personalized learning when the captured image P captured by setting the imaging devices 300_2 and 300_4 as the student imaging device C_S, the imaging devices 300_5 and 300_7 as the input imaging device C_I, and the imaging device 300_1 as the teacher imaging device C_T is the data for learning.

In this case, the learning executor 1323 inputs the captured images P_2 and P_4, which are the student images P_S, to the conversion model as the captured images P_5 and P_7, and obtains the converted image P_V, which is an output result. The captured images P_1 to P_4, P_6, and P_8 other than the captured images P_5 and P_7 are input to the conversion model as an invalid signal such as a black signal.

The learning executor 1323 updates the coefficient data such that the converted image P_V approaches the captured image P_1 which is the teacher image P_T.

(Verification)

The learning executor 1323 verifies the updated coefficient data in accordance with the verification instruction of the plan controller 1322. The learning executor 1323 executes viewpoint conversion on the conversion model using the updated coefficient data for the data for verification. The learning executor 1323 evaluates the performance of a result of the viewpoint conversion processing by using the converted image P_V after the viewpoint conversion. The learning executor 1323 notifies the plan controller 1322 of the evaluation result as the verification result.

The data for verification is data equivalent to the data for learning. The data for verification includes the teacher image P_T and the student image P_S. The learning executor 1323 performs viewpoint conversion processing on the student image P_S of the data for verification. The learning executor 1323 evaluates how close the processing result (converted image P_V) to the teacher image P_T of the data for verification can be obtained.

For example, when the learning executor 1323 uses a part of the learning data as the data for verification, the learning executor 1323 inputs the student image P_S and the black signal to the conversion model to generate the converted image P_V, similarly to the personalized learning.

Note that, here, the data for verification is a part of the learning data acquired by the manager 131, but the data for verification is not limited to such data. The data for verification may be data acquired in advance. In this case, the data for verification can include, as the student image P_S, the captured images P_1 to P_8 captured by all the imaging devices 300_1 to 300_8. The data for verification can include, as the teacher image P_T, a captured image captured by a learning imaging device (not illustrated) substantially from the center of the display 210.

In this case, the user included in the data for verification is assumed to be a person different from the user U who learns by personalized learning.

Therefore, the verification using the data for verification has a larger aspect of verifying the viewpoint conversion processing using all the imaging devices 300_1 to 300_8 rather than verifying the viewpoint conversion processing specialized for the user U by personalized learning.

This verification allows the learning executor 1323 to verify whether the performance of the viewpoint conversion processing using all the imaging devices 300_1 to 300_8 is unreasonably impaired by the personalized learning.

The learning executor 1323 may execute either one of verification using learning data as the data for verification and verification using data captured in advance as the data for verification, or may execute both of the verifications. When both of the verifications are executed, the learning executor 1323 can verify whether the viewpoint conversion processing specialized for the user U can be performed and whether the performance of the viewpoint conversion processing using all the imaging devices 300 is not unreasonably impaired by the personalized learning.

When performing the verification using data captured in advance as the data for verification, the learning executor 1323 can perform personalized learning using all of the learning data acquired by the manager 131 as the data for learning. As a result, the information processing apparatus 100 can acquire the data for learning more efficiently.

Examples of an evaluation index used by the learning executor 1323 for the verification described above include PSNR, SSIM, and LPIPS.

For example, the learning executor 1323 may classify the data for verification for each item (category) of the learning data acquisition plan and verify the learning result for each item. For example, the learning executor 1323 classifies the data for verification into categories by using supplementary information of the learning data such as the combination of the imaging devices 300, the head pose, and the expression.

Since the learning executor 1323 performs verification for each category, the plan controller 1322 can specify a category of learning data that is insufficient for high accuracy of the viewpoint conversion processing. The plan controller 1322 designates a category and requests the manager 131 to acquire additional learning data.

As described above, the learning executor 1323 can manage the learned coefficient data and the verification result using the learned coefficient data in association with each other. In addition, the learning executor 1323 can notify the plan controller 1322 of the verification result with the verification ID. In accordance with the instruction from the plan controller 1322, the learning executor 1323 outputs the learned coefficient data corresponding to the verification ID to the converter 133.

Similarly to the plan controller 1322, the learning executor 1323 can acquire the learning-related information from an external device via the communication unit 110, for example.

As described above, in the personalized learning, an invalid signal is used as an input of a conversion model. Therefore, there is a possibility that the performance of the viewpoint conversion processing using all the imaging devices 300 is unreasonably impaired. In order to avoid this impairment, the learning executor 1323 may insert learning similar to learning performed in advance for an unspecified user U into the personalized learning. In this case, for example, data similar to learning data used for learning targeted for the unspecified user U performed in advance is stored in the storage unit 120.

[Details of Converter 133]

By using the captured images P_1 to P_8 captured by the imaging device 300_1 to 300_8, the converter 133 performs viewpoint conversion as if the captured images are captured from the virtual camera C_V, and generates the converted image P_V.

Figure 18:
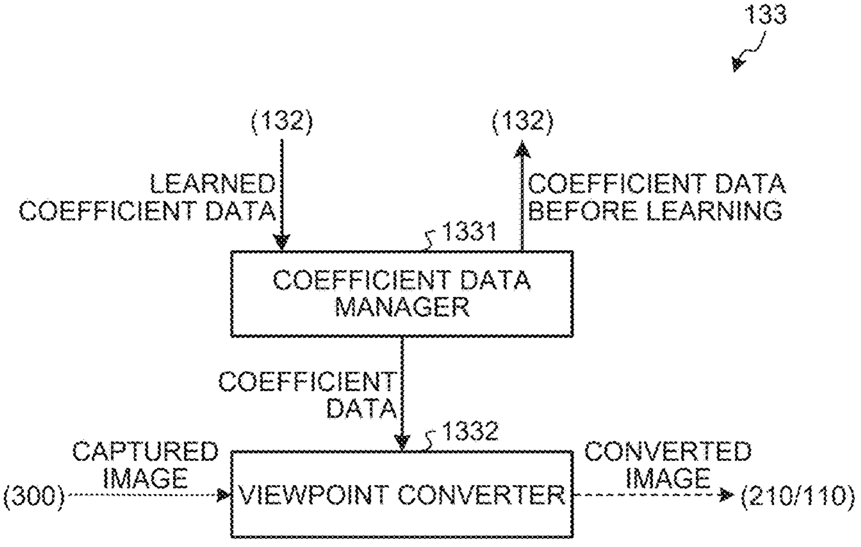
FIG. 18 is a block diagram illustrating a configuration example of a converter according to an embodiment of the present disclosure.

FIG. 18 is a block diagram illustrating a configuration example of the converter 133 according to an embodiment of the present disclosure. As illustrated in FIG. 18, the converter 133 includes a coefficient data manager 1331, a viewpoint converter 1332, and the learning executor 1323.

(Coefficient Data Manager 1331)

The coefficient data manager 1331 manages coefficient data used by the viewpoint converter 1332. For example, when the viewpoint converter 1332 performs viewpoint conversion by using DNN, the coefficient data corresponds to a weighting coefficient of DNN.

The coefficient data manager 1331 manages a plurality of types of coefficient data. The coefficient data manager 1331 manages, for example, coefficient data (hereinafter also referred to as an unspecified target coefficient) learned by learning (hereinafter also referred to as unspecified target learning) targeted for an unspecified user learned in advance. The coefficient data manager 1331 manages coefficient data (hereinafter also referred to as an individual target coefficient) learned by personalized learning.

The coefficient data manager 1331 can manage a plurality of types of unspecified target coefficients. For example, the coefficient data manager 1331 sets a plurality of categories in accordance with age, gender, race, and the like, and manages the unspecified coping coefficient learned by the unspecified target learning performed for each category. The coefficient data manager 1331 manages unspecified target coefficients for each category.

When the coefficient data is requested from the learning controller 132, the coefficient data manager 1331 outputs the coefficient data to the learning controller 132. At this time, the coefficient data output by the coefficient data manager 1331 is a coefficient serving as a base of personalized learning executed by the learning controller 132, and is, for example, coefficient data before learning (unspecified target coefficient).

When the coefficient data manager 1331 manages a plurality of types of unspecified target coefficients, the coefficient data manager 1331 outputs the unspecified target coefficient corresponding to the user U as a target of personalized learning to the learning controller 132. For example, the coefficient data manager 1331 classifies the user U into categories corresponding to age, gender, race, and the like, and outputs the unspecified target coefficient of the same category to the learning controller 132.

The coefficient data manager 1331 may acquire information related to the user U (user attribute information) directly from the user U or may estimate the information from the captured image P obtained by imaging the user U. For example, the information processing apparatus 100 can acquire the user attribute information from the user U when the user U performs use registration.

The coefficient data manager 1331 acquires the learned coefficient data from the learning controller 132. The coefficient data manager 1331 manages the acquired learned coefficient data as a specified target coefficient. For example, when the user U performs telecommunication, the viewpoint converter 1332 converts the captured image P of the imaging device 300 into the converted image P_V. The coefficient data manager 1331 outputs the specified target coefficient used by the viewpoint converter 1332 at this time to the viewpoint converter 1332 as coefficient data.

When the telecommunication by the user U ends, the coefficient data manager 1331 can store the user U and the specified target coefficient in the storage unit 120 in association with each other. When the user U executes telecommunication next time, the coefficient data manager 1331 acquires the specified target coefficient corresponding to the user U from the storage unit 120 and outputs the specified target coefficient to the viewpoint converter 1332.

As a result, when the same user U uses the information processing system 10 a plurality of times, the information processing system 10 can omit personalized learning of the user U for the second and subsequent times.

The coefficient data manager 1331 can store and manage the unspecified target coefficient in the storage unit 120. When different users U use the information processing system 10, the learning controller 132 executes personalized learning for each user U by using the unspecified target coefficient managed by the coefficient data manager 1331. Alternatively, the unspecified target coefficient can be used for the viewpoint conversion for the unspecified user U, for example, when the user uses the information processing system 10 without performing user registration.

(Viewpoint Converter 1332)

By using the coefficient data acquired from the coefficient data manager 1331, the viewpoint converter 1332 converts the viewpoint of the captured image P of the imaging device 300 by machine learning to generate the converted image P_V. The viewpoint converter 1332 can execute the viewpoint conversion by using any machine learning capable of online learning.

The viewpoint converter 1332 presents the converted image P_V to the user U by outputting the converted image P_V to the display 210. The viewpoint converter 1332 transmits the converted image P_V to another information processing system 10 that is a telecommunication partner via the communication unit 110. As a result, the information processing system 10 can present the converted image P_V as if imaged from the virtual camera C_V substantially in the center of the display 210 to the telecommunication partner.

The converter 133 has some of the same functions as the functions of the learning executor 1323 described above (see FIG. 17). This is because the learning executor 1323 has a function of performing personalized learning and a function of verifying the learning. Therefore, the converter 133 and the learning executor 1323 can be configured to share the same function. For example, the converter 133 and the learning executor 1323 may be implemented as one constituent element.

[Details of Estimator 134]

The estimator 134 estimates the face state of the user U from the captured image P of the imaging device 300 and generates face information. The estimator 134 outputs the face information to the manager 131. Here, a case where the estimator 134 estimates the face state from the captured image P will be described, but the estimator 134 can estimate the face state by a sensing technology using a sensor device (not illustrated) such as ToF, for example.

The face information is information indicating the state of the face of the user U at the current time. The face information can be defined as information sufficient for determining whether the items of the learning data acquisition plan created by the manager 131 are satisfied. For example, the face information includes the face position information, the head pose information, and the expression information described above.

The face position information is, for example, information indicating three-dimensional coordinates of the center of gravity of the face of the user U. As described above, the coordinate system of the face position information is desirably the same as the coordinate system of the position information of the imaging device 300.

The head pose information is, for example, information indicating the orientation of the face of the user U. The orientation of the face of the user U is represented by, for example, yaw, roll, and pitch. Alternatively, the head pose information may be, for example, information indicating each pose illustrated in FIG. 15.

The expression information is, for example, information indicating the expression of the user U. The expression information is, for example, information indicating each expression in FIG. 16.

Figure 19:
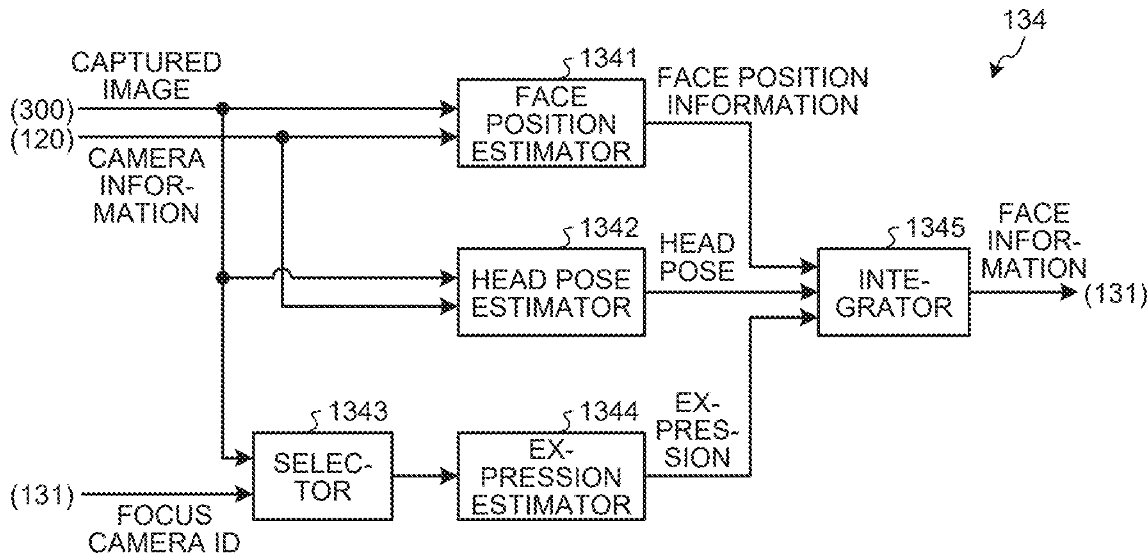
FIG. 19 is a block diagram illustrating a configuration example of an estimator according to an embodiment of the present disclosure.

FIG. 19 is a block diagram illustrating a configuration example of the estimator 134 according to an embodiment of the present disclosure. As illustrated in FIG. 19, the estimator 134 includes a face position estimator 1341, a head pose estimator 1342, a selector 1343, an expression estimator 1344, and an integrator 1345.

The face position estimator 1341 estimates the face position of the user U by using the captured image P of the imaging device 300 and the camera information. The head pose estimator 1342 estimates the head pose of the user U by using the captured image P of the imaging device 300 and the camera information.

The face position estimator 1341 estimates the face position by using a plurality of captured images P. As a result, the face position estimator 1341 can stereoscopically capture the head of the user U by using stereo vision, and further improves the estimation accuracy of the face position.

The estimation accuracy of the face position is improved as the number of captured images P used for estimation of the face position by the face position estimator 1341 is larger. However, as the number of captured images P used for estimation of the face position increases, processing time also increases. How many captured images P the face position estimator 1341 uses for estimation of the face position depends on the estimation accuracy of the face position and the processing time. The face position estimator 1341 estimates the face position by using the number of captured images P that can be estimated with higher accuracy in real time.

Similarly, the head pose estimator 1342 can estimate the head pose with higher accuracy by using the plurality of captured images P.

The selector 1343 uses focus camera ID information to select a captured image P (hereinafter also referred to as a focus image) of the imaging device 300 (focus camera) with which the user U confronts from the captured image P of the imaging device 300. The selector 1343 outputs the selected focus image to the expression estimator 1344.

The expression estimator 1344 estimates the expression of the user U by using the focus image. As described above, the focus image is an image captured by the focus camera confronting the user U. Therefore, there is a high possibility that the focus image is an image in which the user U faces forward. The expression estimator 1344 can estimate the expression of the user U with higher accuracy by estimating the expression of the user U by using the focus image.

The integrator 1345 acquires the face position information estimated by the face position estimator 1341, the head pose information estimated by the head pose estimator 1342, and the expression information estimated by the expression estimator 1344. The integrator 1345 synchronizes information estimated by each unit, integrates each information, and outputs the integrated information to the manager 131 as the face information.

The face position information, the head pose information, and the expression information included in the face information are desirably information of the user U at the same time. The integrator 1345 synchronizes these information to generate the face information including the face position information, the head pose information, and the expression information at the same time.

In the example in FIG. 19, a case where the estimator 134 includes a plurality of processing units has been described, but the configuration of the estimator 134 is not limited to this configuration.

Figure 20:
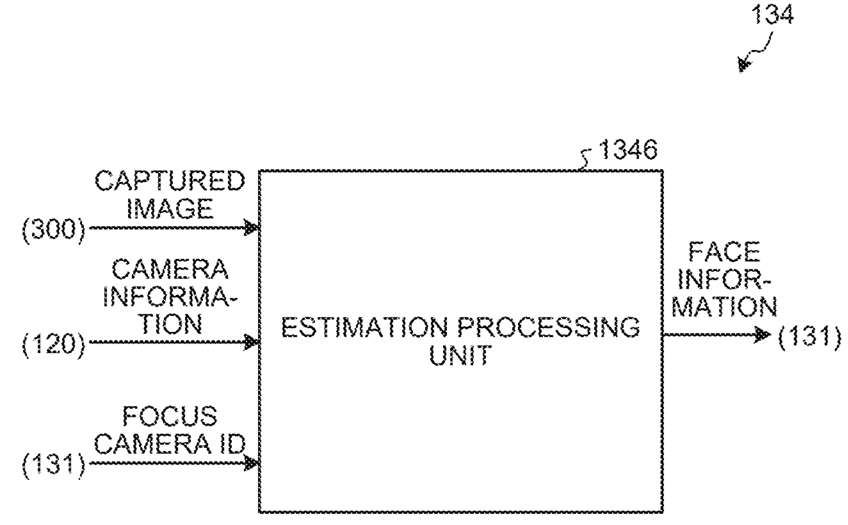
FIG. 20 is a block diagram illustrating another configuration example of the estimator according to an embodiment of the present disclosure.

FIG. 20 is a block diagram illustrating another configuration example of the estimator 134 according to an embodiment of the present disclosure. The estimator 134 illustrated in FIG. 20 includes an estimation processing unit 1346 instead of the face position estimator 1341, the head pose estimator 1342, the selector 1343, the expression estimator 1344, and the integrator 1345.

The estimation processing unit 1346 generates the face information by using the captured image P of the imaging device 300, the camera information, and the focus camera ID information. The estimation processing unit 1346 can generate the face information by using, for example, machine learning.

As described above, although means for implementing the face state estimation processing by the estimator 134 is arbitrary, since the face information is used for guiding the user U, the estimator 134 is required to be able to estimate the face state in real time.

[Details of UI Controller 135]

The UI controller 135 acquires the guidance instruction from the manager 131. The UI controller 135 generates a UI image on the basis of the guidance instruction. The UI controller 135 generates a display image in which the UI image is superimposed on the captured image P, and outputs the display image to the display 210.

Figure 21:
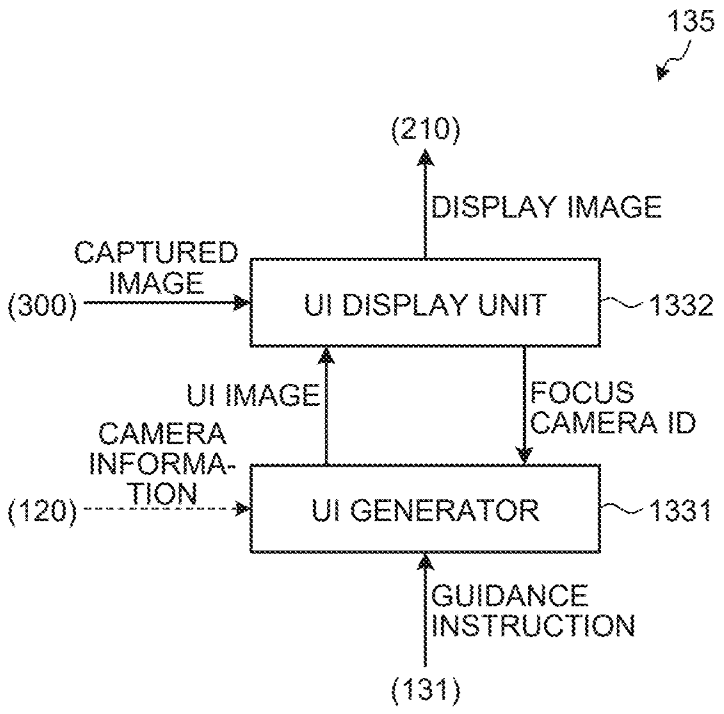
FIG. 21 is a block diagram illustrating a configuration example of a UI controller according to an embodiment of the present disclosure.

FIG. 21 is a block diagram illustrating a configuration example of the UI controller 135 according to an embodiment of the present disclosure. As illustrated in FIG. 21, the UI controller 135 includes a UI generator 1351 and a UI display unit 1352.

(UI Generator 1351)

The UI generator 1351 generates a UI image on the basis of the guidance instruction acquired from the manager 131. The UI image is an image for guiding the user U to a desired position, head pose, or expression.

The guidance instruction includes, for example, face position information (hereinafter also referred to as guidance position information) as a guidance target and current face position information (hereinafter also referred to as current position information) of the user U. The guidance position information includes three-dimensional information of the face position as a guidance destination. The current position information includes three-dimensional information of the current face position of the user U.

Alternatively, the guidance instruction may include a direction for guiding the user U to move (hereinafter also referred to as a guidance direction) and a movement amount (hereinafter also referred to as a guidance amount).

The guidance instruction includes, for example, the focus camera ID information.

The guidance instruction includes, for example, information related to the head pose as the guidance target (hereinafter also referred to as guidance head pose information). The guidance head pose information is, for example, information for designating a pose as a target from among a plurality of head poses illustrated in FIG. 15. Alternatively, the guidance head pose information may be information indicating yow, roll, and pitch of the head pose as a target.

The guidance instruction may include current head pose information (hereinafter also referred to as current head pose information) in addition to the guidance head pose information. The current head pose information may be, for example, information designating a pose close to the pose taken by the user U among the plurality of head poses illustrated in FIG. 15, or may be information indicating yow, roll, and pitch of the head pose of the user U.

The guidance instruction includes, for example, information related to the expression as the guidance target (hereinafter also referred to as guidance expression information). The guidance expression information is, for example, information for designating the expression as a target from the plurality of expressions illustrated in FIG. 16. For example, when the expression includes utterance of a designated sentence, the guidance instruction includes information related to the designated sentence.

The guidance instruction includes, for example, information related to an achievement status (hereinafter also described as achievement status information). The achievement status information is, for example, information indicating whether the guidance target is achieved in terms of the face position, the head pose, and the expression of the user U. The achievement status information is represented as success or failure of guidance for each item of the face position, the head pose, and the expression of the user U.

The UI generator 1351 generates a UI image on the basis of the guidance instruction.

Figure 22:
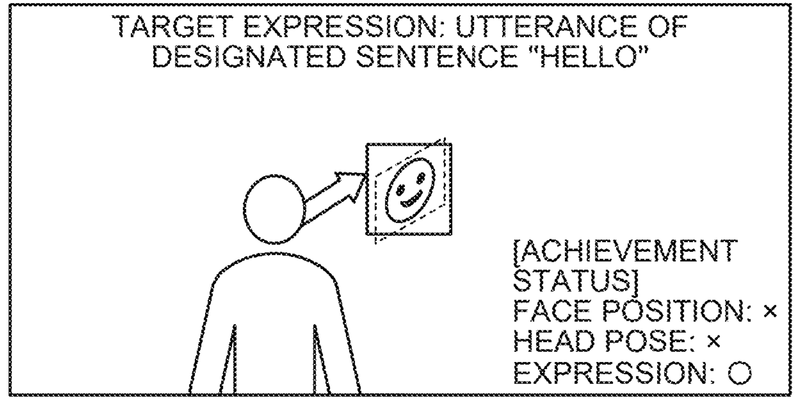
FIG. 22 is a diagram for describing an example of a UI image according to an embodiment of the present disclosure.

FIG. 22 is a diagram for describing an example of the UI image according to an embodiment of the present disclosure. FIG. 22 illustrates a display image in which the UI image is superimposed on the captured image P. Here, the UI image generated by the UI generator 1351 when the guidance instruction includes the guidance position information and the current position information will be described.

The UI generator 1351 generates a face position UI image indicating the face position as a target on the basis of the guidance position information. For example, the UI generator 1351 generates a face position UI image including a square frame having coordinates included in the guidance position information as center coordinates.

Furthermore, the UI generator 1351 generates, as a movement UI image, an arrow with the face position of the current position information as a start point and the face position UI image as an end point. The information processing apparatus 100 prompts the user U to move the face position by using the face position UI image and the movement UI image.

The UI generator 1351 can draw a stereoscopic three-dimensional arrow as the movement UI image. As a result, the UI generator 1351 can prompt the user U to move in a direction perpendicular to the display 210 in addition to prompting the user U to move in a direction parallel to the display 210.

At this time, the UI generator 1351 uses the camera information to draw the face position UI image and the movement UI image at appropriate coordinate positions.

The UI generator 1351 generates a head pose UI image to be superimposed on the face position UI image. The head pose UI image is an image indicating a head pose included in the guidance head pose information.

When the guidance head pose information includes information designating a pose, an image indicating the designated pose is generated as the head pose UI image.

When the guidance head pose information includes parameter information such as yow, roll, or pitch, the UI generator 1351 generates the head pose UI image by drawing the head pose according to the parameter. At this time, the UI generator 1351 can present a deviation (difference) between the current head pose and the head pose as a target to the user U by using the current head pose information. Alternatively, the UI generator 1351 can generate the UI image that prompts an action to reduce the deviation, for example, an arrow in a direction in which the head is inclined.

By the UI generator 1351 generating the head pose UI image so as to be superimposed on the face position UI image, the information processing apparatus 100 can prompt the user U to take the head pose as a target together with the movement to the face position as a target. The user U can intuitively recognize a moving direction of the face position and the head pose to be taken.

The UI generator 1351 generates the expression UI image indicating the guidance expression information. The expression UI image is, for example, character information indicating a target expression such as "joy" and "anger". The display UI image may include a face icon indicating an emotion.

When utterance of a designated sentence is designated as an expression by guidance display information, the UI generator 1351 generates the expression UI image indicating that the target expression is the designated sentence as illustrated in FIG. 22. The expression UI image includes utterance content ("HELLO" in the example in FIG. 22).

The facial expression UI image can be superimposed at a position easily visible to the user U, for example, an upper part of the display image.

The UI generator 1351 generates an achievement UI image indicating the achievement status information. The achievement UI image is an image indicating an achievement status for each item such as the face position, the head pose, and the expression. In the example in FIG. 22, items that have achieved the target are indicated by "○", and items that have not achieved the target are indicated by "X". In FIG. 22, the face position and the head pose have not achieved the target, but the expression has achieved the target. That is, it is indicated that the user U is uttering.

Note that the UI image generated by the UI generator 1351 is not limited to the above example. For example, the UI generator 1351 may highlight a UI image related to an unachieved item (in the example in FIG. 22, the face position UI image, the movement UI image, and the head pose UI image). For example, the UI generator 1351 highlights a UI image related to an unachieved item by blinking the UI image or drawing the UI image in a color different from the other UI images.

When the display image is presented to the user U, the UI controller 135 generates the display image by superimposing the UI image on an image obtained by horizontally inverting the captured image P. The UI generator 1351 generates a UI image in consideration of horizontal inversion of the captured image P. By the UI controller 135 inverting the captured image P to generate the display image, the user U can confirm the user U similarly to a case of looking at a mirror.

Figure 23:
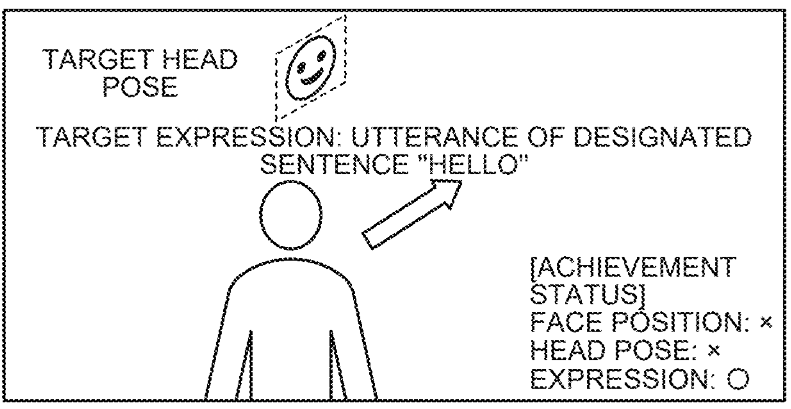
FIG. 23 is a diagram for describing another example of the UI image according to an embodiment of the present disclosure.

FIG. 23 is a diagram for describing another example of the UI image according to an embodiment of the present disclosure. FIG. 23 illustrates the display image in which the UI image is superimposed on the captured image P. Here, the UI image generated by the UI generator 1351 when the guidance instruction includes the guidance direction and the guidance amount will be described. Note that description of the same UI image as the UI image illustrated in FIG. 22 will not be described.

In the example in FIG. 23, the UI generator 1351 generates an arrow indicating the guidance direction and the guidance amount as an arrow UI image instead of the face position UI image and the movement UI image. Since the UI generator 1351 has not acquired the face position information of the user U, the arrow UI image is drawn at a position that does not depend on the position of the user U (in the example in FIG. 23, substantially in a center of the display image).

The UI generator 1351 displays a head pose UI image representing the head pose as a target (hereinafter also referred to as a target head pose) at a predetermined position. In the example in FIG. 23, the head pose UI image is drawn at a position easily visible to the user U, for example, the upper part of the display image. Therefore, in the example illustrated in FIG. 23, the expression UI image is drawn immediately below the head pose UI image.

In this case, the UI generator 1351 can generate the UI image without using the position information of the imaging device 300.

The UI generator 1351 outputs the generated UI image and the focus camera ID information indicating the focus camera ID to the UI display unit 1352.

(UI Display Unit 1352)

The UI display unit 1352 generates a display image by superimposing the UI image on the focus image captured by the focus camera on the basis of the focus camera ID information. At this time, the UI display unit 1352 generates the display image by horizontally inverting the focus image and superimposing the UI image as described above.

The UI display unit 1352 presents the display image to the user U by outputting the display image to the display 210.

Although a case where the UI controller 135 guides the user U by using the image information has been described here, the method of guiding the user U is not limited to the method using the image information. For example, the UI controller 135 may guide the user U by using voice or an LED lamp. For example, the UI controller 135 may cause the user U to recognize the position of the focus camera by turning on an LED lamp installed near the focus camera.

3. INFORMATION PROCESSING

3.1. Learning Processing

Figure 24:
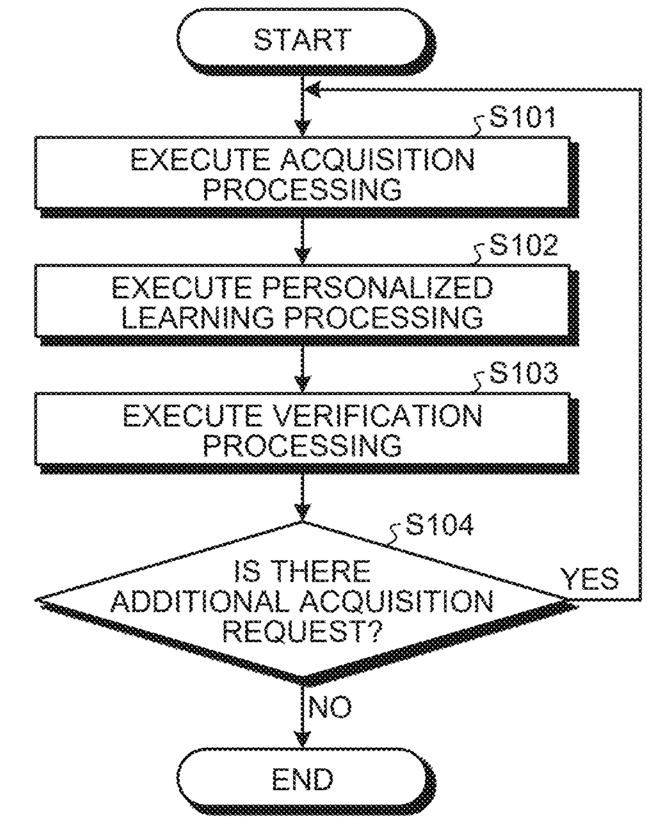
FIG. 24 is a flowchart illustrating an example of a flow of learning processing according to an embodiment of the present disclosure.

FIG. 24 is a flowchart illustrating an example of a flow of learning processing according to an embodiment of the present disclosure. The learning processing illustrated in FIG. 24 is executed by the information processing apparatus 100. For example, when the user U performs user registration, the information processing apparatus 100 executes the learning processing illustrated in FIG. 24 before the user U is provided with the telecommunication service.

As illustrated in FIG. 24, the information processing apparatus 100 executes acquisition processing (step S101). The acquisition processing is, for example, processing executed when learning data is acquired.

The information processing apparatus 100 executes personalized learning processing by using the acquired learning data (step S102). The information processing apparatus 100 executes verification processing of verifying the result of the personalized learning performed in the personalized learning processing (step S103).

The information processing apparatus 100 determines whether there is an additional acquisition request for the learning data as a result of the execution of the verification processing (step S104). When there is an additional acquisition request (step S104; Yes), the information processing apparatus 100 returns to step S101 and executes the acquisition processing. On the other hand, when there is no additional acquisition request (step S104; No), the information processing apparatus 100 ends the learning processing.

After ending the learning processing, the information processing apparatus 100 provides the telecommunication service to the user U, for example, in accordance with an instruction from the user U.

The information processing apparatus 100 can perform the acquisition processing and the personalized learning processing and the verification processing in parallel. For example, when predetermined learning data is acquired, the information processing apparatus 100 can execute personalized learning processing and verification processing even while executing the acquisition processing.

3.2. Acquisition Processing

Figure 25:
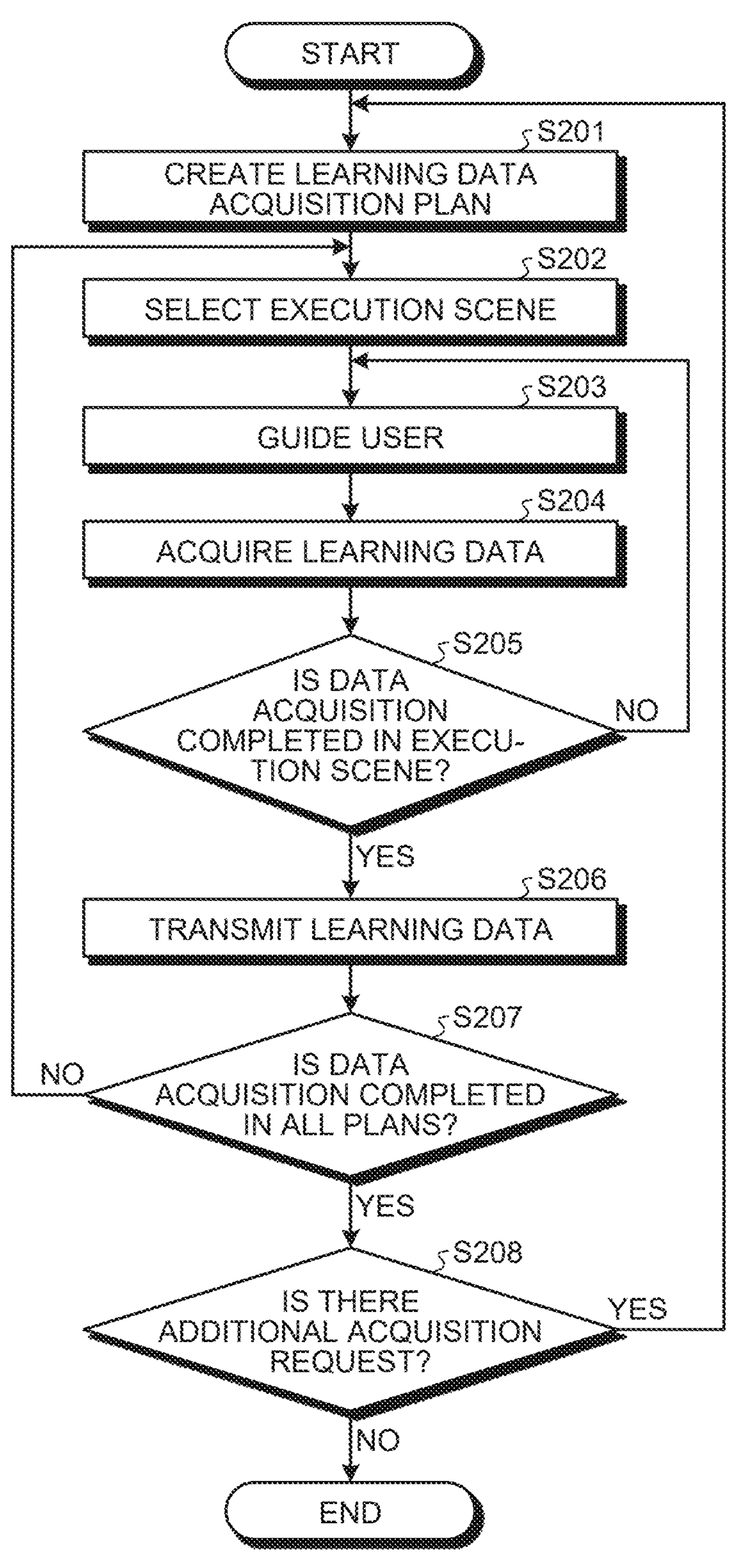
FIG. 25 is a flowchart illustrating an example of a flow of acquisition processing according to an embodiment of the present disclosure.

FIG. 25 is a flowchart illustrating an example of a flow of the acquisition processing according to an embodiment of the present disclosure. The acquisition processing illustrated in FIG. 25 is mainly executed by the manager 131 of the information processing apparatus 100.

As illustrated in FIG. 25, the manager 131 creates a learning data acquisition plan (step S201). The manager 131 selects a scene to be executed from the learning data acquisition plan (hereinafter also referred to as an execution scene) (step S202). For example, the manager 131 selects the first scene described above.

The manager 131 executes guidance processing and guides the user U such that the face state of the user U becomes the face state as a target corresponding to the execution scene (step S203). After the guidance is completed, the manager 131 acquires learning data corresponding to an execution step (step S204).

The manager 131 determines whether the acquisition of the learning data in the execution step has been completed (step S205). For example, the manager 131 determines whether the acquisition of the learning data has been completed in accordance with whether the learning data of the length (number of frames) as a target has been acquired in the face state as a target.

For example, when the user U moves in the middle of the acquisition of the learning data and the acquisition of the learning data has not been completed (step S205; No), the manager 131 returns to step S203. On the other hand, in a case where the acquisition of the learning data has been completed (step S205; Yes), the manager 131 transmits the acquired learning data to the learning controller 132 (step S206).

Next, the manager 131 determines whether the acquisition of the learning data has been completed in all the plans of the learning data acquisition plan (step S207). When there is a scene for which learning data has not been acquired (step S207; No), the manager 131 returns to step S202.

When the acquisition of the learning data has been completed in all the plans (step S207; Yes), that is, when the learning data is acquired in all the scenes, the manager 131 determines whether there is an additional acquisition request from the learning controller 132 (step S208).

When there is an additional acquisition request (step S208; Yes), the manager 131 returns to step S201. On the other hand, when there is no additional acquisition request (step S208; No), the manager 131 ends the acquisition processing.

3.3. Guidance Processing

Figure 26:
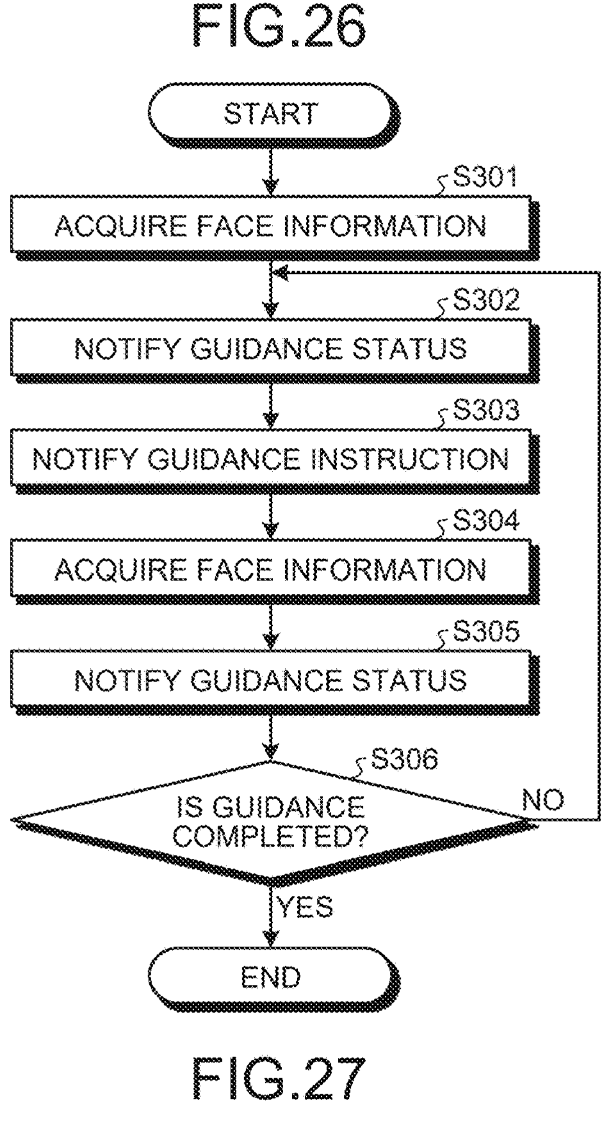
FIG. 26 is a flowchart illustrating an example of a flow of guidance processing according to an embodiment of the present disclosure.

FIG. 26 is a flowchart illustrating an example of a flow of the guidance processing according to an embodiment of the present disclosure. The guidance processing illustrated in FIG. 26 is mainly executed by the guidance controller 1312 of the information processing apparatus 100.

The guidance controller 1312 acquires the face information from the estimator 134 (step S301). The guidance controller 1312 acquires a guidance target according to the execution step from the creation controller 1311 (step S302). The manager 131 generates a guidance instruction on the basis of the guidance target and notifies the UI controller 135 of the guidance instruction (step S303).

The guidance controller 1312 acquires the face information from the estimator 134 (step S304). The guidance controller 1312 generates a guidance status on the basis of the acquired face information, and notifies the creation controller 1311 of the guidance status (step S305).

The guidance controller 1312 determines whether the user U has been guided to the guidance target, that is, whether the guidance has been completed (step S306). When the guidance has not been completed (step S306; No), the guidance controller 1312 returns to step S302. When the guidance has been completed (step S306; Yes), the guidance controller 1312 ends the guidance processing.

Note that, here, the guidance controller 1312 determines whether the guidance has been completed, but the creation controller 1311 may determine whether the guidance has been completed. In this case, the creation controller 1311 determines whether the guidance has been completed on the basis of the guidance status acquired from the guidance controller 1312.

When the guidance has been completed, the creation controller 1311 acquires learning data. When the guidance has not been completed, the creation controller 1311 can create, for example, a new guidance target and notify the guidance controller 1312 of the creation of the new guidance target. Alternatively, the creation controller 1311 may notify that the guidance has not been completed. In this case, the guidance controller 1312 generates a guidance instruction again on the basis of the already acquired guidance target.

3.4. UI Generation Processing

Figure 27:
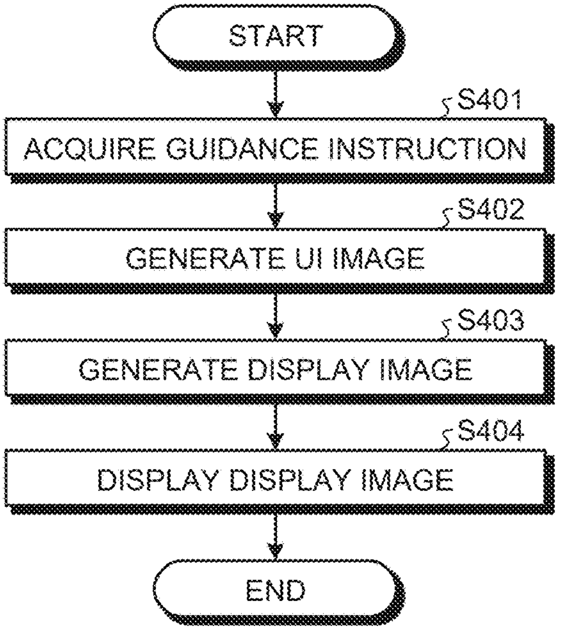
FIG. 27 is a flowchart illustrating an example of a flow of UI generation processing according to an embodiment of the present disclosure.

FIG. 27 is a flowchart illustrating an example of a flow of UI generation processing according to an embodiment of the present disclosure. The UI generation processing illustrated in FIG. 27 is mainly executed by the UI controller 135 of the information processing apparatus 100. For example, the UI controller 135 executes the UI generation processing illustrated in FIG. 27 when acquiring the guidance instruction from the guidance controller 1312.

The UI controller 135 acquires the guidance instruction from the guidance controller 1312 (step S401). The UI controller 135 generates a UI image on the basis of the guidance instruction (step S402).

The UI controller 135 generates a display image (step S403). For example, the UI controller 135 generates a display image by superimposing the UI image on an image obtained by horizontally inverting the focus image captured by the focus camera.

The UI controller 135 causes the display 210 to display a display image (step S404).

3.5. Personalized Learning Processing

Figure 28:
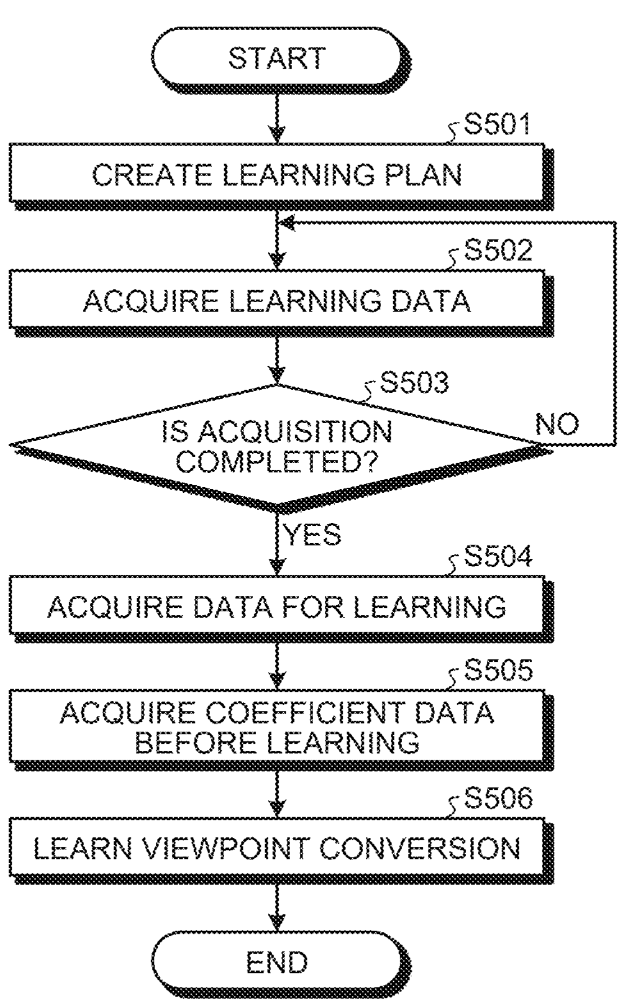
FIG. 28 is a flowchart illustrating an example of a flow of personalized learning processing according to an embodiment of the present disclosure.

FIG. 28 is a flowchart illustrating an example of a flow of the personalized learning processing according to an embodiment of the present disclosure. The personalized learning processing illustrated in FIG. 28 is executed by the learning controller 132 of the information processing apparatus 100.

The learning controller 132 creates a learning plan (step S501). The learning controller 132 acquires learning data from the manager 131 (step S502).

The learning controller 132 determines whether the acquisition of the learning data has been completed (step S503). When the learning controller 132 acquires a predetermined amount of learning data from the manager 131, the learning controller 132 determines that the acquisition of the learning data has been completed. In addition, the learning controller 132 determines that the acquisition of the learning data has been completed when the acquisition of the learning data by the manager 131 has been completed.

When the acquisition of the learning data has not been completed (step S503; No), the learning controller 132 returns to step S502. When the acquisition of the learning data has been completed (step S503; Yes), the learning controller 132 acquires, for example, data for learning that is at least a part of the learning data stored in the storage unit 120 (step S504).

The learning controller 132 acquires the coefficient data before learning (for example, an unspecified target coefficient) used for personalized learning (step S505). The learning controller 132 performs personalized learning and learns viewpoint conversion specialized for the individual user U as an individual (step S506).

3.6. Verification Processing

Figure 29:
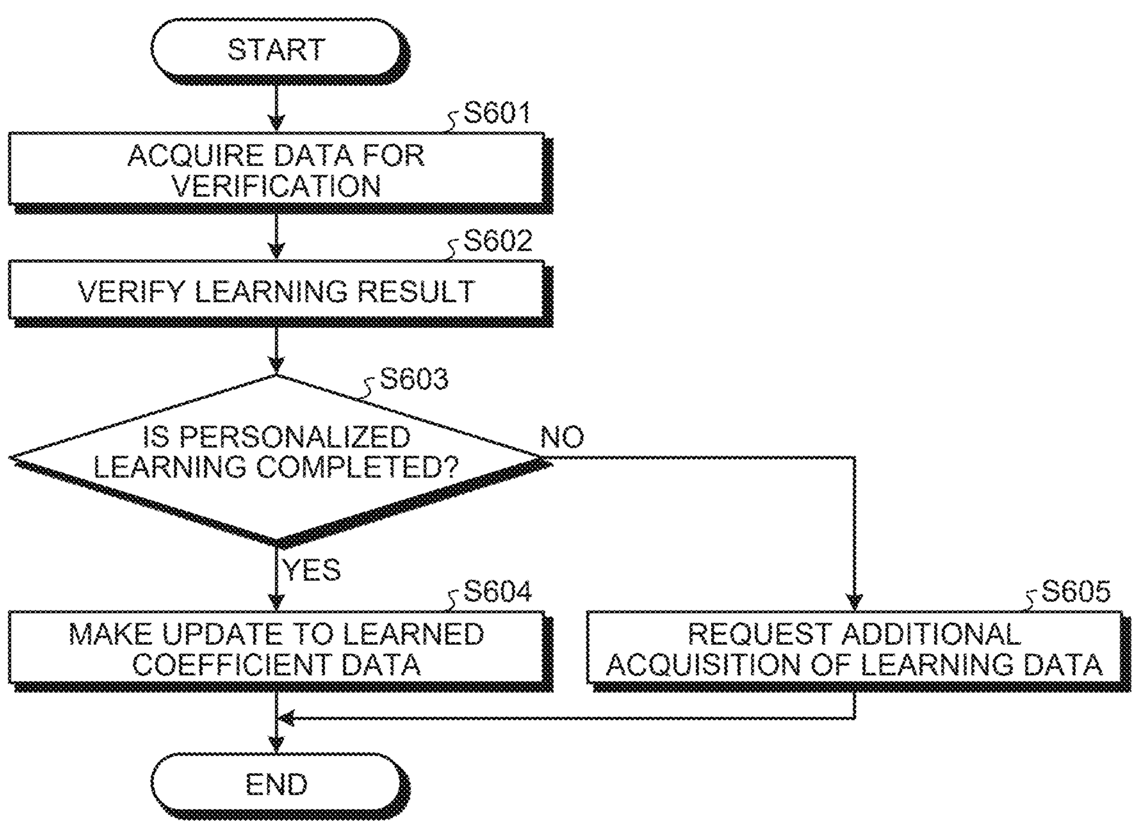
FIG. 29 is a flowchart illustrating an example of a flow of verification processing according to an embodiment of the present disclosure.

FIG. 29 is a flowchart illustrating an example of a flow of the verification processing according to an embodiment of the present disclosure. The verification processing illustrated in FIG. 29 is executed by the learning controller 132 of the information processing apparatus 100.

The learning controller 132 acquires, for example, data for verification stored in the storage unit 120 (step S601). The data for verification is data generated in advance for personalized learning. Alternatively, the learning controller 132 may acquire at least a part of the learning data from the storage unit 120 as data for verification.

The learning controller 132 verifies a learning result of the personalized learning (step S602). The learning controller 132 verifies the learning result using the coefficient data and the data for verification updated by the personalized learning.

The learning controller 132 determines whether the personalized learning has been completed (step S603). For example, when the verification result in step S602 satisfies desired accuracy, the learning controller 132 determines that the personalized learning has been completed.

When the desired accuracy cannot be satisfied even if the learning is performed a predetermined number of times, the learning controller 132 determines that the personalized learning has been completed. For example, the learning controller 132 determines that the personalized learning has been completed when the desired accuracy cannot be satisfied even if the personalized learning is executed by requesting the manager 131 to acquire additional learning data a predetermined number of times.

When the personalized learning has been completed (step S603; Yes), the learning controller 132 notifies the converter 133 of the learned coefficient data to update the coefficient data used by the converter 133 to the learned coefficient data (step S604).

When the personalized learning has not been completed (step S603; No), the learning controller 132 requests the manager 131 to additionally acquire learning data (step S605). The learning controller 132 notifies the manager 131 of an additional acquisition request.

The information processing apparatus 100 according to an embodiment of the present disclosure performs viewpoint conversion using machine learning. The information processing apparatus 100 performs learning of viewpoint conversion (unspecified target learning) in advance by using a versatile data set. The information processing apparatus 100 performs viewpoint conversion processing by using the captured images P of all the imaging devices 300 included in the information processing system 10 to generate the converted image P_V as if captured from the virtual camera C_V.

At this time, the information processing apparatus 100 performs the unspecified target learning so that the captured image P captured by at least one imaging device 300 among all the imaging devices 300 included in the information processing system 10 can be input and viewpoint conversion can be performed. For example, the information processing apparatus 100 performs the unspecified target learning by using invalid data such as a randomly selected captured image P and black image.

When starting the personalized learning, the information processing apparatus 100 first creates a learning data acquisition plan. The information processing apparatus 100 creates a learning data acquisition plan by using symmetry of arrangement of the imaging device 300 in consideration of known camera information (information related to the position and arrangement of the imaging device 300) or camera information acquired from an external device (not illustrated).

The information processing apparatus 100 estimates the face state of the user U from the captured image P of the imaging device 300. The information processing apparatus 100 uses, for example, the camera information for estimating the face state.

The information processing apparatus 100 guides the user U to have a desired face position, head pose, and expression in accordance with the learning data acquisition plan. The information processing apparatus 100 guides the user U by causing the display image on which the UI image is superimposed to be displayed on the display 210. The information processing apparatus 100 continues the guidance of the user U until the user U has a desired face state.

When the user U has a desired face state, the information processing apparatus 100 acquires learning data. The information processing apparatus 100 converts the learning data into a predetermined format in accordance with the execution scene of the learning data acquisition plan and stores the converted learning data in the storage unit 120.

The information processing apparatus 100 determines an appropriate hyperparameter with reference to known learning-related information or learning-related information acquired from an external device (not illustrated). The information processing apparatus 100 refers to the hyperparameter, performs the personalized learning by using the data for learning generated from at least a part of the learning data, and updates the coefficient data.

The information processing apparatus 100 verifies the learning result of the personalized learning by using, for example, data for verification generated from at least a part of the learning data. The information processing apparatus 100 evaluates the performance of the learning result and determines to acquire additional learning data in accordance with the evaluation result. When acquiring the additional learning data, the information processing apparatus 100 updates the learning data acquisition plan to acquire the learning data. The information processing apparatus 100 may create a new learning data acquisition plan when execution of the learning data acquisition plan has already been completed at a time point when the information processing apparatus 100 determines to acquire additional learning data.

4. HARDWARE CONFIGURATION

Figure 30:
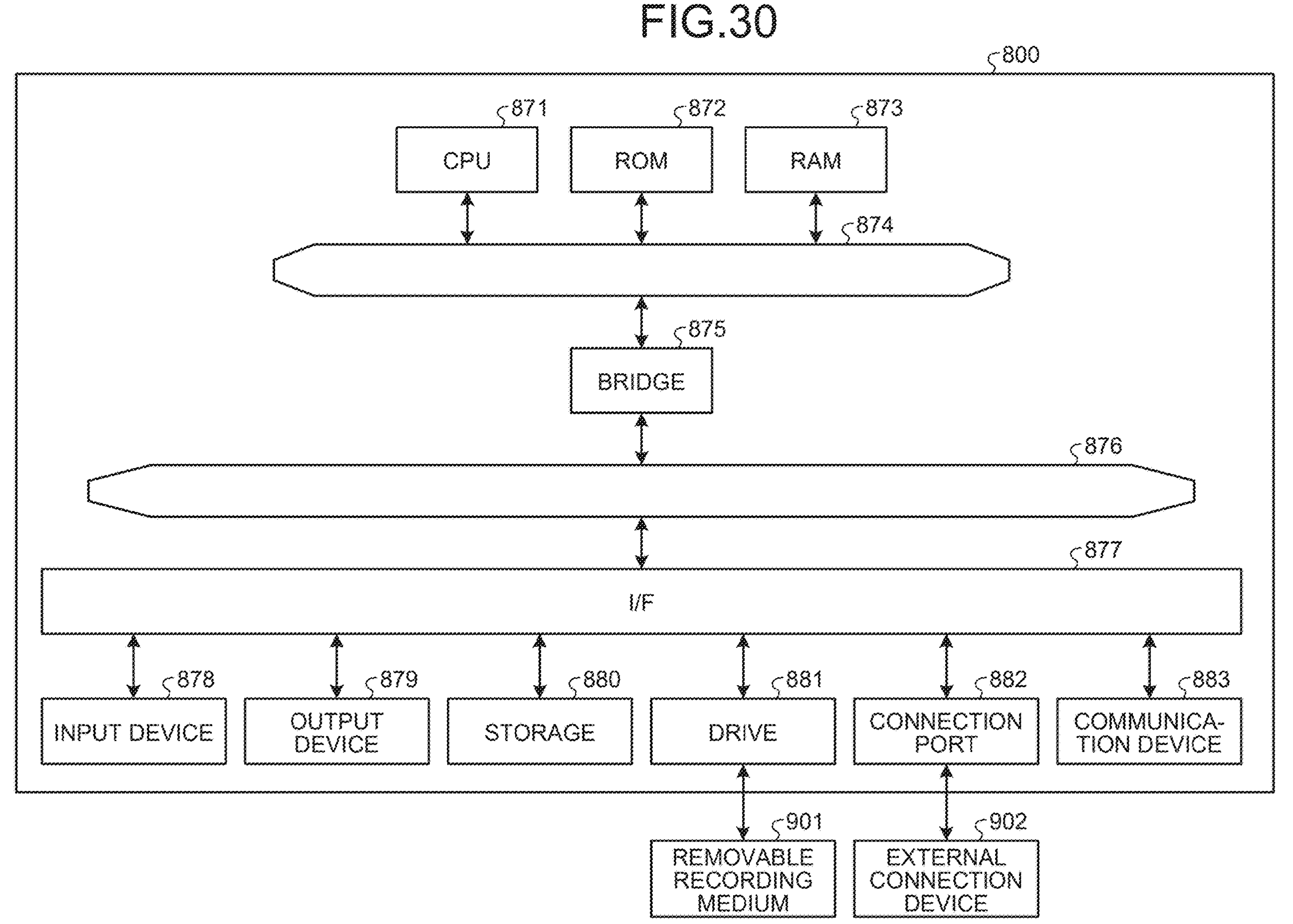
FIG. 30 is a block diagram illustrating an example of a hardware configuration of an information processing apparatus according to the present embodiment.

A hardware configuration of the information processing apparatus according to the present embodiment will be described with reference to FIG. 30. FIG. 30 is a block diagram illustrating an example of a hardware configuration of an information processing apparatus 800 according to the present embodiment. Note that the information processing apparatus 800 illustrated in FIG. 30 can implement, for example, the information processing apparatus 100. Information processing by the information processing apparatus 100 according to the present embodiment is implemented by cooperation of software and hardware described below.

As illustrated in FIG. 30, the information processing apparatus 800 includes, for example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the constituent elements may be omitted. In addition, constituent elements other than the constituent elements illustrated here may be further included.

(CPU 871)

The CPU 871 functions as, for example, a calculation processing device or a control device, and controls an overall motion of each constituent element or a part of the motion on the basis of various programs recorded in the ROM 872, the RAM 873, the storage 880, or a removable recording medium 901.

Specifically, the CPU 871 implements motion processing in the information processing apparatus 100.

(ROM 872 and RAM 873)

The ROM 872 is means that stores a program read by the CPU 871, data used for calculation, and the like. The RAM 873 temporarily or permanently stores, for example, a program read by the CPU 871, various parameters that appropriately change when the program is executed, and the like.

(Host Bus 874, Bridge 875, External Bus 876, and Interface 877)

The CPU 871, the ROM 872, and the RAM 873 are mutually connected via, for example, the host bus 874 capable of high-speed data transmission. On the other hand, the host bus 874 is connected to the external bus 876 having a relatively low data transmission speed via the bridge 875, for example. The external bus 876 is connected to various constituent elements via the interface 877.

(Input Device 878)

As the input device 878, for example, a mouse, a keyboard, a touch panel, a button, a switch, a lever, and the like are used. Furthermore, as the input device 878, a remote controller capable of transmitting a control signal by using infrared rays or other radio waves may be used. The input device 878 includes a voice input device such as a microphone.

(Output Device 879)

The output device 879 is a device capable of visually or audibly notifying the user of acquired information, such as a display device such as a cathode ray tube (CRT), an LCD, or an organic EL, an audio output device such as a speaker or a headphone, a printer, a mobile phone, or a facsimile. The output device 879 according to the present disclosure includes various vibration devices capable of outputting tactile stimulation. The output device 879 implements, for example, the output device 200.

(Storage 880)

The storage 880 is a device for storing various data. As the storage 880, for example, a magnetic storage device such as a hard disk drive (HDD), a semiconductor storage device, an optical storage device, a magneto-optical storage device, or the like is used.

(Drive 881)

The drive 881 is, for example, a device that reads information recorded on the removable recording medium 901 such as a magnetic disk, an optical disk, a magneto-optical disk, or a semiconductor memory, or writes information to the removable recording medium 901.

(Removable Recording Medium 901)

The removable recording medium 901 is, for example, a DVD medium, a Blu-ray (registered trademark) medium, an HD DVD medium, various semiconductor storage media, or the like. Of course, the removable recording medium 901 may be, for example, an IC card on which a non-contact IC chip is mounted, an electronic device, or the like.

(Connection Port 882)

The connection port 882 is a port for connecting an external connection device 902 such as a universal serial bus (USB) port, an IEEE1394 port, a small computer system interface (SCSI), an RS-232C port, or an optical audio terminal.

(External Connection Device 902)

The external connection device 902 is, for example, a printer, a portable music player, a digital camera, a digital video camera, an IC recorder, or the like.

(Communication Device 883)

The communication device 883 is a communication device for connecting to a network, and is, for example, a communication card for wired or wireless LAN, Wi-Fi (registered trademark), Bluetooth (registered trademark), or wireless USB (WUSB), a router for optical communication, a router for asymmetric digital subscriber line (ADSL), a modem for various communications, or the like.

5. OTHER EMBODIMENTS

The embodiments described above are examples, and various changes and applications are possible.

For example, although the position of the virtual camera C_V is substantially in the center of the display 210 in the embodiments, the position of the virtual camera C_V is not limited to this position. For example, the position of the virtual camera C_V may be slightly above the substantially center of the display 210. For example, the position of the virtual camera C_V may be the position of the face or eyes (for example, substantially the center of both eyes) of the user U displayed on the display 210.

In this case, the imaging device 300 is also arranged so as to have symmetry with respect to the virtual camera C_V. That is, the imaging device 300 can be arranged such that a relative positional relationship between the virtual camera C_V and the input imaging device C_I substantially coincides with a relative positional relationship between the teacher imaging device C_T and the student imaging device C_S.

For example, a communication program for executing the above motion is stored and distributed in a computer-readable recording medium such as an optical disk, a semiconductor memory, a magnetic tape, or a flexible disk. Then, for example, the program is installed in a computer, and the above processing is executed to configure the control device. At this time, the control device may be a device (for example, a personal computer) outside the information processing apparatus 100. The control device may be a device (for example, the controller 130) inside the information processing apparatus 100.

The communication program may be stored in a disk device included in a server device on a network such as the Internet so as to be downloaded to the computer. The above functions may be implemented by cooperation of an operating system (OS) and application software. In this case, a portion other than the OS may be stored in a medium and distributed, or a portion other than the OS may be stored in the server device so as to be downloaded to the computer.

Among the processing described in the above embodiments, all or a part of the processing described as being performed automatically can be performed manually, or all or a part of the processing described as being performed manually can be performed automatically by a known method. The processing procedures, specific names, and information including various data and parameters illustrated in the description and the drawings can be arbitrarily changed unless otherwise specified. For example, the various types of information illustrated in the drawings are not limited to the illustrated information in the drawings.

Each constituent element of each device illustrated in the drawings is functionally conceptual, and is not required to be physically configured as illustrated in the drawings. That is, a specific form of distribution and integration of each device is not limited to the illustrated form, and all or a part of the specific form can be functionally or physically distributed and integrated in an arbitrary unit in accordance with various loads, use conditions, and the like. Note that this configuration by distribution and integration may be performed dynamically.

The above embodiments can be appropriately combined in a region in which the processing contents do not contradict each other.

For example, the present embodiment can be implemented as any configuration constituting a device or a system, for example, a processor as a system large scale integration (LSI) or the like, a module using a plurality of processors or the like, a unit using a plurality of modules or the like, a set obtained by further adding other functions to a unit, or the like (that is, a configuration of a part of the device).

Note that, in the present embodiment, the system means a group of a plurality of constituent elements (devices, modules (parts), or the like), regardless of whether all the constituent elements are in the same housing. Therefore, a plurality of devices accommodated in separate housings and connected via a network and one device in which a plurality of modules is accommodated in one housing are both systems.

For example, the present embodiment can adopt a configuration of cloud computing in which one function is shared and processed by a plurality of devices in cooperation via a network.

6. CONCLUSION

Although the embodiments of the present disclosure have been described above, the technical scope of the present disclosure is not limited to the above embodiments as it is, and various modifications can be made without departing from the gist of the present disclosure. The constituent elements of different embodiments and modifications may be appropriately combined.

The effects in the embodiments described in the present specification are merely examples and are not limited, and other effects may be provided.

Note that the present technique can also have the following configurations.

(1)

An information processing apparatus comprising a controller that controls an output device to guide a user to oppose a first imaging device of the first imaging device and a second imaging device arranged to have symmetry with respect to a virtual camera set for a display, acquires, from the first imaging device, a teacher image including the user opposing the first imaging device, and performs learning processing of viewpoint conversion of the second imaging device to correspond to a viewpoint of the virtual camera on a basis of the teacher image and the symmetry of the first imaging device and the second imaging device with respect to the virtual camera.

(2)

The information processing apparatus according to (1), wherein the first imaging device and the second imaging device are disposed around the display.

(3)

The information processing apparatus according to (1) or (2), wherein the controller selects the first imaging device from among a plurality of imaging devices.

(4)

The information processing apparatus according to (3), wherein the controller performs the learning by sequentially switching the first imaging device to be selected.

(5)

The information processing apparatus according to (3) or (4), wherein the controller selects the imaging device disposed at a corner of the display as the first imaging device among the plurality of imaging devices disposed around the display.

(6)

The information processing apparatus according to (3) or (4), wherein the controller selects the imaging device disposed substantially in a center of a side of the display as the first imaging device among the plurality of imaging devices disposed around the display.

(7)

The information processing apparatus according to any one of (3) to (6), wherein the controller selects the imaging device disposed at a corner of the display as the second imaging device among the plurality of imaging devices disposed around the display.

(8)

The information processing apparatus according to any one of (3) to (6), wherein the controller selects the imaging device disposed substantially in a center of a side of the display as the second imaging device among the plurality of imaging devices disposed around the display.

(9)

The information processing apparatus according to any one of (1) to (8), wherein the virtual camera is set substantially in a center of the display.

(10)

The information processing apparatus according to any one of (1) to (9), wherein the controller relearns a model learned in advance as the learning processing.

(11)

The information processing apparatus according to any one of (1) to (10), wherein the controller controls the output device to guide the user to oppose the first imaging device of the first imaging device, the second imaging device, and a third imaging device arranged to have the symmetry with respect to the virtual camera, and performs the learning processing of the viewpoint conversion of the second imaging device and the third imaging device to correspond to the viewpoint of the virtual camera on a basis of the teacher image and the symmetry of the first imaging device, the second imaging device, and the third imaging device with respect to the virtual camera.

(12)

The information processing apparatus according to any one of (1) to (11), wherein the controller instructs the output device to guide at least one of an expression of the user, an orientation of a face of the user, and a position of the face of the user.

(13)

The information processing apparatus according to (12), wherein when at least two of the expression of the user, the orientation of the face of the user, or the position of the face of the user are guidance targets, the controller instructs the output device to sequentially guide the guidance targets one by one.

(14)

An information processing method comprising:

controlling an output device to guide a user to oppose a first imaging device of the first imaging device and a second imaging device arranged to have symmetry with respect to a virtual camera set for a display;

acquiring, from the first imaging device, a teacher image including the user opposing the first imaging device; and performing learning processing of viewpoint conversion of the second imaging device to correspond to a viewpoint of the virtual camera on a basis of the teacher image and the symmetry of the first imaging device and the second imaging device with respect to the virtual camera.

(15)

A computer-readable recording medium that records a program that causes a computer to:

control an output device to guide a user to oppose a first imaging device of the first imaging device and a second imaging device arranged to have symmetry with respect to a virtual camera set for a display;

acquire, from the first imaging device, a teacher image including the user opposing the first imaging device; and perform learning processing of viewpoint conversion of the second imaging device to correspond to a viewpoint of the virtual camera on a basis of the teacher image and the symmetry of the first imaging device and the second imaging device with respect to the virtual camera.

REFERENCE SIGNS LIST

1 TELECOMMUNICATION SYSTEM
10 INFORMATION PROCESSING SYSTEM
100 INFORMATION PROCESSING APPARATUS
110 COMMUNICATION UNIT
120 STORAGE UNIT
130 CONTROLLER
131 MANAGER
132 LEARNING CONTROLLER
133 CONVERTER
134 ESTIMATOR

135 UI CONTROLLER
200 OUTPUT DEVICE
210 DISPLAY
220 SPEAKER
300 IMAGING DEVICE
1311 CREATION CONTROLLER 1312 GUIDANCE CONTROLLER
1313 DATA GENERATOR
1321 DATA MANAGER
1322 PLAN CONTROLLER
1323 LEARNING EXECUTOR
1331 COEFFICIENT DATA MANAGER
1332 VIEWPOINT CONVERTER
1341 FACE POSITION ESTIMATOR
1342 HEAD POSE ESTIMATOR
1343 SELECTOR
1344 EXPRESSION ESTIMATOR
1345 INTEGRATOR
1346 ESTIMATION PROCESSING UNIT
1351 UI GENERATOR
1352 UI DISPLAY UNIT

The invention claimed is:

1. An information processing apparatus, comprising:
a controller configured to:
control an output device to guide a user to oppose a first imaging device of a plurality of imaging devices, wherein
the plurality of imaging devices includes a second imaging device,
an arrangement of the first imaging device and the second imaging device is symmetrical with respect to a virtual camera, and
the virtual camera is set virtually on a display device;
acquire, from the first imaging device, a teacher image, wherein the teacher image includes an image of the user that opposes the first imaging device;
control the second imaging device to acquire a student image of the user; and
execute a learning process of viewpoint conversion for the student image of the user, wherein
the learning process is executed for the student image to change a viewpoint of the second imaging device to correspond to a viewpoint of the virtual camera, and
the learning process is executed based on the teacher image and the symmetrical arrangement of the first imaging device and the second imaging device with respect to the virtual camera.

2. The information processing apparatus according to claim 1, wherein the first imaging device and the second imaging device are around the display device.

3. The information processing apparatus according to claim 1, wherein the controller is further configured to select the first imaging device from the plurality of imaging devices.

4. The information processing apparatus according to claim 3, wherein
the controller is further configured to execute the learning process by sequential switch of selection of an imaging device among the plurality of imaging devices, and
the imaging device is selected as the first imaging device.

5. The information processing apparatus according to claim 3, wherein
the controller is further configured to select the first imaging device that is at a corner of the display device, and
the plurality of imaging devices is around the display device.

6. The information processing apparatus according to claim 3, wherein
the controller is further configured to select the first imaging device that is substantially in a center of a side of the display device, and
the plurality of imaging devices is around the display device.

7. The information processing apparatus according to claim 3, wherein
the controller is further configured to select the second imaging device that is at a corner of the display device, and
the plurality of imaging devices is around the display device.

8. The information processing apparatus according to claim 3, wherein
the controller is further configured to select the second imaging device that is in a center of a side of the display device, and
the plurality of imaging devices is around the display device.

9. The information processing apparatus according to claim 1, wherein the virtual camera is set substantially in a center of the display device.

10. The information processing apparatus according to claim 1, wherein the controller is further configured to relearn a model after the learning process.

11. The information processing apparatus according to claim 1, wherein
the plurality of imaging devices further includes a third imaging device,
an arrangement of the first imaging device, the second imaging device, and the third imaging device is symmetrical with respect to the virtual camera,
the controller is further configured to execute the learning process of the viewpoint conversion of the second imaging device and the third imaging device to correspond to the viewpoint of the virtual camera, and
the learning process is executed based on the teacher image and the symmetrical arrangement of the first imaging device, the second imaging device, and the third imaging device with respect to the virtual camera.

12. The information processing apparatus according to claim 1, wherein the controller is further configured to instruct the output device to guide at least one of an expression of the user, an orientation of a face of the user, or a position of the face of the user.

13. The information processing apparatus according to claim 12, wherein in a case where at least two of the expression of the user, the orientation of the face of the user, or the position of the face of the user are guidance targets, the controller is further configured to instruct the output device to sequentially guide the guidance targets one by one.

14. An information processing method, comprising:
controlling an output device to guide a user to oppose a first imaging device of a plurality of imaging devices, wherein
the plurality of imaging devices includes a second imaging device,
an arrangement of the first imaging device and the second imaging device is symmetrical with respect to a virtual camera, and
the virtual camera is set virtually on a display device;

acquiring, from the first imaging device, a teacher image, wherein the teacher image includes an image of the user that opposes the first imaging device;

controlling the second imaging device to acquire a student image of the user; and executing a learning process of viewpoint conversion for the student image of the user, wherein the learning process is executed for the student image to change a viewpoint of the second imaging device to correspond to a viewpoint of the virtual camera, and the learning process is executed based on the teacher image and the symmetrical arrangement of the first imaging device and the second imaging device with respect to the virtual camera.

15. A non-transitory computer-readable medium having stored thereon, computer-executable instructions which, when executed by a computer, cause the computer to execute operations, the operations comprising:

controlling an output device to guide a user to oppose a first imaging device of a plurality of imaging devices, wherein the plurality of imaging devices includes a second imaging device, an arrangement of the first imaging device and the second imaging device is symmetrical with respect to a virtual camera, and the virtual camera is set virtually on a display device;

acquiring, from the first imaging device, a teacher image, wherein the teacher image includes an image of the user that opposes the first imaging device;

controlling the second imaging device to acquire a student image of the user; and executing a learning process of viewpoint conversion for the student image of the user, wherein the learning process is executed for the student image to change a viewpoint of the second imaging device to correspond to a viewpoint of the virtual camera, and the learning process is executed based on the teacher image and the symmetrical arrangement of the first imaging device and the second imaging device with respect to the virtual camera.

* * * * *